United States Patent
Park et al.

(10) Patent No.: US 12,477,240 B2
(45) Date of Patent: Nov. 18, 2025

(54) VISION SENSOR, EVENT SIGNAL PROCESSING METHOD OF THE VISION SENSOR, AND IMAGING PROCESSING DEVICE INCLUDING THE VISION SENSOR

(71) Applicant: SAMSUNG ELECTRONICS CO., LTD., Suwon-si (KR)

(72) Inventors: Keunjoo Park, Suwon-si (KR); Junseok Kim, Suwon-si (KR); Junhyuk Park, Suwon-si (KR); Bongki Son, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 112 days.

(21) Appl. No.: 18/436,743

(22) Filed: Feb. 8, 2024

(65) Prior Publication Data
US 2024/0276109 A1 Aug. 15, 2024

(30) Foreign Application Priority Data
Feb. 13, 2023 (KR) .................. 10-2023-0018865

(51) Int. Cl.
H04N 25/47 (2023.01)
H04N 25/60 (2023.01)
H04N 25/78 (2023.01)

(52) U.S. Cl.
CPC ............. *H04N 25/47* (2023.01); *H04N 25/60* (2023.01); *H04N 25/78* (2023.01)

(58) Field of Classification Search
CPC ......... H04N 25/47; H04N 25/60; H04N 25/78
See application file for complete search history.

(56) References Cited

U.S. PATENT DOCUMENTS

| | | |
|---|---|---|
| 10,248,222 B2 | 4/2019 | Lee et al. |
| 10,944,912 B2 | 3/2021 | Herman |
| 11,297,268 B2 | 4/2022 | Sakakibara |
| 11,303,804 B2 | 4/2022 | Sironi et al. |
| 11,416,759 B2 | 8/2022 | Lang et al. |
| 12,096,137 B2 * | 9/2024 | Kaizu .................. H04N 23/745 |
| 2021/0067679 A1 | 3/2021 | Tornes |
| 2021/0400183 A1 | 12/2021 | Hejl et al. |

(Continued)

FOREIGN PATENT DOCUMENTS

| | | |
|---|---|---|
| WO | 2021/111873 A1 | 6/2021 |
| WO | 2021/190745 A1 | 9/2021 |

(Continued)

*Primary Examiner* — Nicholas G Giles
(74) *Attorney, Agent, or Firm* — Sughrue Mion, PLLC

(57) ABSTRACT

A vision sensor is provided. The vision sensor includes: a pixel array including a plurality of pixels, each of the plurality of pixels being configured to generate an event signal based on an event in which intensity of incident light changes; and an event detection circuit including a state register including a first flip-flop and a second flip-flop. The event detection circuit is configured to: based on the event signal, store first data in the first flip-flop, the first data indicating whether flicker has occurred in each of the plurality of pixels, store second data in the second flip-flop, the second data indicating whether the event has occurred in each of the plurality of pixels, and based on a comparison of the first data and the second data, identify and delete a portion of the second data in which the flicker has occurred.

20 Claims, 13 Drawing Sheets

(56) References Cited

U.S. PATENT DOCUMENTS

| | | |
|---|---|---|
| 2022/0100658 A1 | 3/2022 | Perrone et al. |
| 2022/0101640 A1 | 3/2022 | Lagorce |
| 2022/0284593 A1 | 9/2022 | Naganuma et al. |
| 2023/0108884 A1 | 4/2023 | Miyazaki et al. |
| 2024/0114255 A1* | 4/2024 | Kaizu .................... H04N 25/47 |

FOREIGN PATENT DOCUMENTS

| | | |
|---|---|---|
| WO | 2021/200523 A1 | 10/2021 |
| WO | 2022/188120 A1 | 9/2022 |

* cited by examiner

VISION SENSOR, EVENT SIGNAL PROCESSING METHOD OF THE VISION SENSOR, AND IMAGING PROCESSING DEVICE INCLUDING THE VISION SENSOR

CROSS-REFERENCE TO RELATED APPLICATION

This application claims priority to Korean Patent Application No. 10-2023-0018865, filed on Feb. 13, 2023, in the Korean Intellectual Property Office, the disclosure of which is incorporated by reference herein in its entirety.

BACKGROUND

The present disclosure relates to a vision sensor and an imaging processing device including the vision sensor.

Human-computer interaction (HCI) may be expressed and performed through a user interface. Various types of user interfaces that recognize user inputs may provide natural interaction between humans and computers. Various types of sensors may be used to recognize user inputs.

In general, image sensors may be largely classified into image sensors operating synchronously and image sensors operating asynchronously. A representative example of image sensors operating synchronously is a complementary metal-oxide semiconductor (CMOS) image sensor. A representative example of image sensors operating asynchronously is a dynamic vision sensor (DVS).

A DVS detects a change in intensity of incident light, generates an event signal (e.g., an on-event signal or an off-event signal), and transmits the event signal to a processor.

A flicker phenomenon refers to a phenomenon (e.g., a flickering phenomenon) in which the intensity of light emitted from a peripheral lighting device of an image processing system or an electronic device including a display periodically changes. An ideal DVS is designed not to detect such a flicker phenomenon as an event, but an actual DVS detects the aforementioned flicker phenomenon as an event, and there is a concern that overall performance of the image processing system may deteriorate due to an error generated by flicker. In addition, when a time stamp and pixel data of each pixel of a pixel array are mapped and stored in order to remove flicker within the image processing system itself, a significant amount of data processing occurs in the process of processing data mapped to all pixels and a separate memory is required to accommodate the amount of data processing.

SUMMARY

One or more example embodiments provide improve the performance of a vision sensor by identifying and removing flicker from the vision sensor.

Technical problems addressed by the present disclosure are not limited to the technical problem described above, and other technical problems not described above will be clearly understood by those of ordinary skill in the art from the following description.

According to an aspect of an example embodiment, a vision sensor includes: a pixel array including a plurality of pixels, each of the plurality of pixels being configured to generate an event signal based on an event in which intensity of incident light changes; and an event detection circuit including a state register including a first flip-flop and a second flip-flop. The event detection circuit is configured to: based on the event signal, store first data in the first flip-flop, the first data indicating whether flicker has occurred in each of the plurality of pixels, store second data in the second flip-flop, the second data indicating whether the event has occurred in each of the plurality of pixels, and based on a comparison of the first data and the second data, identify and delete a portion of the second data in which the flicker has occurred.

According to an aspect of an example embodiment, an operating method of a vision sensor includes: reading an event signal from a pixel array including a plurality of pixels configured to generate the event signal by detecting an event in which intensity of incident light changes; based on the event signal, storing first data in a first flip-flop, the first data indicating whether flicker has occurred in each of the plurality of pixels; storing second data in a second flip-flop, the second data indicating whether the event has occurred in each of the plurality of pixels; and based on a comparison of the first data and the second data, identifying and deleting a portion of the second data in which the flicker has occurred.

According to an aspect of an example embodiment, a vision sensor includes: a pixel array including a plurality of pixels, each of the plurality of pixels being configured to generate an event signal based on an event in which intensity of incident light changes; and an event detection circuit configured to read the event signal from the pixel array and process the event signal, the event detection circuit including a state register including a first flip-flop and a second flip-flop. The event detection circuit is configured to: store, in the first flip-flop, first data to which a first state and a second state are mapped, the first state indicating flicker occurs in a corresponding pixel of the plurality of pixels, and the second state indicating no occurrence of the flicker in the corresponding pixel, store, in the second flip-flop, second data to which a third state, a fourth state, and a fifth state are mapped, the third state indicating an on-event in the corresponding pixel, the fourth state indicating an off-event in the corresponding pixel, and the fifth state indicating no occurrence of the event in the corresponding pixel, and based on a comparison of the first data and the second data, identify and delete a portion of the second data corresponding to the first state of the first data.

BRIEF DESCRIPTION OF DRAWINGS

The above and other aspects and features will be more apparent from the following description of example embodiments taken in conjunction with the accompanying drawings, in which.

DETAILED DESCRIPTION

Hereinafter, example embodiments will be described with reference to the accompanying drawings. Each example embodiment provided in the following description is not excluded from being associated with one or more features of another example or another example embodiment also provided herein or not provided herein but consistent with the present disclosure. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Figure 1:
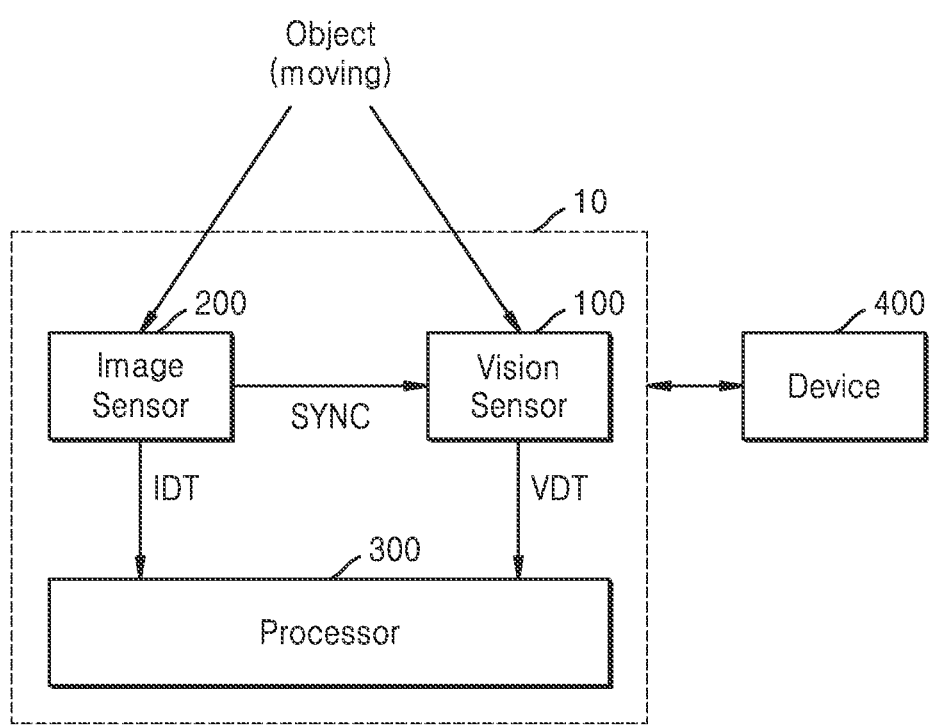
FIG. 1 is a block diagram of an image processing device according to an example embodiment.

FIG. 1 is a block diagram of an image processing device 10 according to an example embodiment.

Referring to FIG. 1, the image processing device 10 may include a vision sensor 100, an image sensor 200, and a processor 300. The image processing device 10 according to an example embodiment may be mounted on an electronic device having an image or light sensing function. For example, the image processing device 10 may be mounted on an electronic device, such as a camera, a smartphone, a wearable device, an Internet of things (IoT) device, a tablet personal computer (PC), a personal digital assistant (PDA), a portable multimedia player (PMP), a navigation device, a drone, or an advanced driver assistance system (ADAS). Also, the image processing device 10 may be provided as a component in vehicles, furniture, manufacturing facilities, doors, or various measurement devices.

The vision sensor 100 may be an event-based vision sensor. The vision sensor 100 may detect a change in intensity of incident light and output an event signal. The vision sensor 100 may be a dynamic vision sensor that outputs event signals indicating pixels in which the change in the intensity of light is detected, that is, to pixels in which an event has occurred. When an event in which the intensity of light increases has occurred, the vision sensor 100 may output an on-event corresponding to the event. In contrast, when an event in which the intensity of light decreases has occurred, the vision sensor 100 may output an off-event. The change in the intensity of light may be caused by motion of an object photographed by the vision sensor 100 or flickering of the object (e.g., a lamp, a display screen, or the like). Also, the change in the intensity of light may be caused by motion of the vision sensor 100 or the image processing device 10 itself. The vision sensor 100 may periodically or aperiodically transmit pieces of vision sensor data VDT including event signals to the processor 300.

The vision sensor 100 may be a frame-based vision sensor. For example, the vision sensor 100 may output event signals by scanning all pixels constituting the vision sensor 100 in each reference period. However, unlike related complementary metal-oxide semiconductor (CMOS) image sensors, the vision sensor 100 may not output event signals for all pixels, and may output event signals only for pixels in which the change in the intensity of light is detected. In this case, an event signal output from the vision sensor 100 may be converted into a synchronous event signal by a processor or the like.

In an example embodiment, the vision sensor 100 may transmit, to the processor 300, vision sensor data VDT including an image frame generated by the image sensor 200 and an event signal generated by the vision sensor 100, based on a synchronization signal SYNC received from the image sensor 200.

In another example embodiment, the vision sensor 100 may generate a time stamp that may be used to match the image frame generated by the image sensor 200 to the event signal generated by the vision sensor 100, based on the synchronization signal SYNC received from the image sensor 200, and transmit, to the processor 300, the vision sensor data VDT including the generated time stamp. The time stamp may include information about a time point when the image sensor 200 is exposed, a time point when the image frame is generated, or a time point when the event signal of the vision sensor 100 is generated.

For example, the vision sensor 100 may transmit, to the processor 300, the vision sensor data VDT including information about whether an event has occurred and the amount of change in illuminance caused by the occurrence of the event, by using a self-initialization circuit and a counter included in each pixel in the vision sensor 100.

Also, the vision sensor 100 may output a device synchronization signal for synchronizing external devices including the image sensor 200 with the vision sensor 100, by using the synchronization signal SYNC received from the image sensor 200 or an internal signal of the vision sensor 100. The vision sensor 100 may output a plurality of device synchronization signals and individually control the device synchronization signals.

The image sensor 200 may convert optical signals of an object incident through an optical lens into electrical signals, generate image sensor data IDT based on the electrical signals, and output the image sensor data IDT. The image sensor 200 may include, for example, a pixel array and a readout circuit, the pixel array including a plurality of pixels arranged in two dimensions. The pixel array may convert received optical signals into electrical signals. The pixel array may be implemented as, for example, a photoelectric conversion element, such as a charge-coupled device (CCD) or a CMOS image sensor, and may be implemented as other types of photoelectric conversion elements. The readout circuit may generate raw data based on the electrical signals provided from the pixel array and output, as image sensor data IDT, the raw data or raw data on which preprocessing, such as bad pixel removal, has been performed. The image sensor 200 may be implemented as a semiconductor chip or package including a pixel array and a readout circuit.

The image sensor 200 may generate a synchronization signal SYNC to be transmitted to the vision sensor 100 in order to synchronize the vision sensor 100 and the image sensor 200 with each other. The synchronization signal SYNC may be generated considering shutter signal information, readout signal information, or image frame information about the image sensor 200.

The processor 300 may perform image processing on the image sensor data IDT provided from the image sensor 200. For example, the processor 300 may perform image processing for changing a data format of the image sensor data IDT (e.g., changing image data of Bayer patterns into the format of YUV or red-green-blue (RGB)), and image processing for enhancing image quality, such as noise cancellation, brightness adjustment, or sharpness adjustment. The processor 300 may process the vision sensor data VDT received from the vision sensor 100 and detect motion of an object (or motion of an object on an image recognized by the image processing device 10) based on an event signal within the vision sensor data VDT.

Also, the processor 300 may match an image frame included in the image sensor data IDT provided from the image sensor 200 to the vision sensor data VDT received from the vision sensor 100, by using the time stamp and pieces of synchronization signal information.

For example, by matching the vision sensor data VDT to the image sensor data IDT, the vision sensor data VDT including information about whether an event has occurred and the amount of change in illuminance caused by the occurrence of the event, by using the time stamp and the pieces of synchronization signal information, the processor 300 may efficiently use an algorithm (e.g., a CMOS image sensor (CIS) deblur algorithm) for removing motion blur caused by the motion of the object from image data.

The processor 300 may process signals detected by the vision sensor 100.

The processor 300 may include an application-specific integrated circuit (ASIC), a field-programmable gate array (FPGA), a dedicated microprocessor, a microprocessor, or the like. Alternatively, the processor 300 may include a general-purpose processor.

The image processing device 10 according to example embodiments detects flicker from data of pixels constituting the vision sensor 100 and corrects the flicker (e.g., flicker removal correction) based on flip-flops, and accordingly, the performance of the image processing device 10 may be improved. According to a scheme based on the flip-flops described above, flicker may be efficiently removed from the vision sensor data VDT with a minimum memory capacity.

In addition, the vision sensor 100, the image sensor 200, and the processor 300 may each be implemented as an integrated circuit (IC). For example, the vision sensor 100, the image sensor 200, and the processor 300 may each be implemented as a separate semiconductor chip. Alternatively, the vision sensor 100, the image sensor 200, and the processor 300 may be implemented in a single chip. For example, the vision sensor 100, the image sensor 200, and the processor 300 may be implemented as a system on chip (SoC).

The image processing device 10 may control a device 400 outside the image processing device 10 and collect data. The image processing device 10 may match the data collected from the device 400 by using the time stamp. The device 400 may include an acceleration sensor, an inertial measurement unit (IMU), a gyro sensor, an infrared (IR) light-emitting diode (LED), a flash light, or the like.

Figure 2:
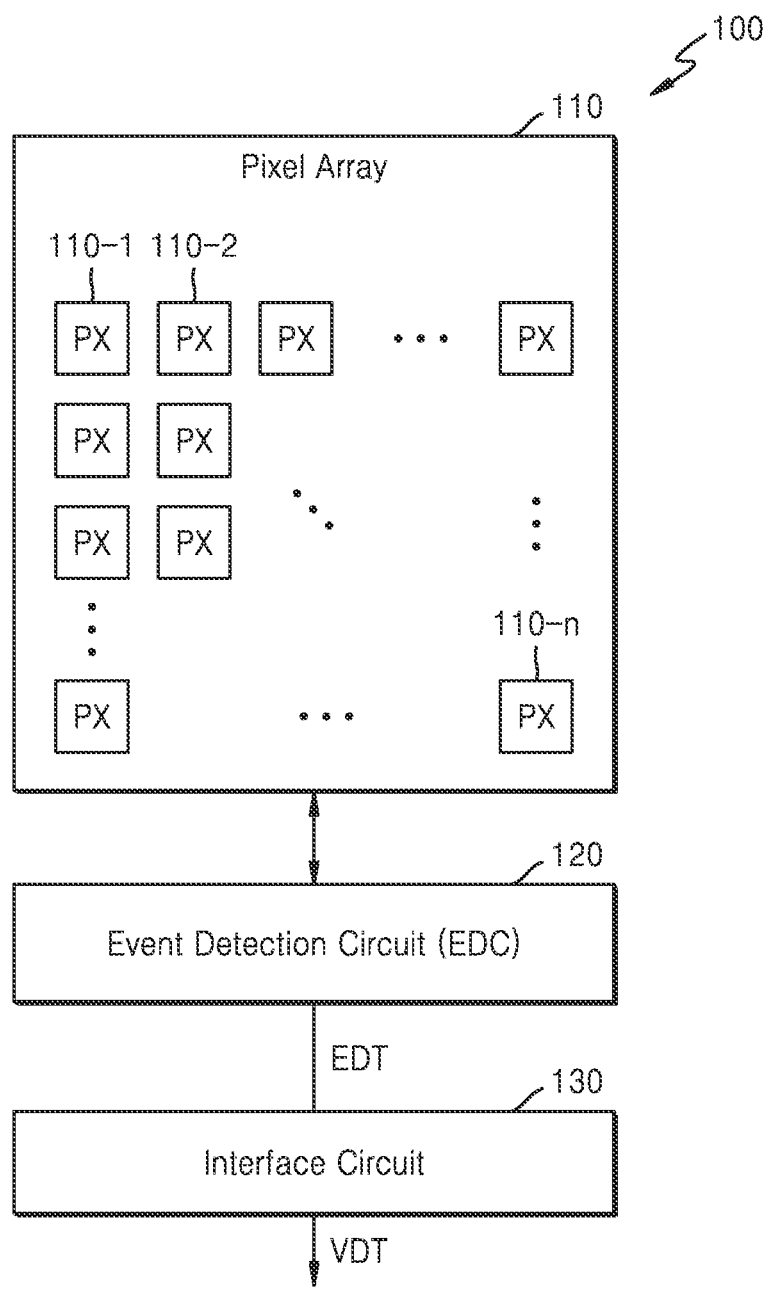
FIG. 2 is a block diagram of a vision sensor according to an example embodiment.

FIG. 2 is a block diagram of the vision sensor 100 according to an example embodiment.

In detail, FIG. 2 is a block diagram of the vision sensor 100 of FIG. 1.

Referring to FIGS. 1 and 2, the vision sensor 100 may include a pixel array 110, an event detection circuit (EDC) 120, and an interface circuit 130.

The pixel array 110 may include a plurality of pixels PX (e.g., 110-1 to 110-$n$) arranged in a matrix of i rows and j columns. Each of the plurality of pixels PX may generate an event signal by subtracting events in which the intensity of incident light increases or decreases. For example, each of the plurality of pixels PX may be connected to the EDC 120 through a column line extending in a column direction and a row line extending in a row direction. In an example embodiment, a signal indicating that an event has occurred and polarity information of the event (that is, whether the event is an on-event in which the intensity of light increases or an off-event in which the intensity of light decreases) may be output to the EDC 120 from a pixel PX in which the event has occurred. In another example embodiment, the polarity information of the event is omitted, and the signal indicating that the event has occurred may be output to the EDC 120 from the pixel PX in which the event has occurred.

The EDC 120 may read an event signal from the pixel array 110 and process the event signal. The EDC 120 may generate event data EDT including an address of the pixel PX in which the event has occurred. In an example embodiment, the event data EDT may further include not only the address of the pixel PX in which the event has occurred but also the polarity information of the event and a time stamp. The EDC 120 may process events that have occurred in the pixel array 110 in units of pixels PX, units of pixel PX groups including a plurality of pixels PX, column units, or frame units. In an example embodiment, the EDC 120 may process k consecutive column units as one frame.

The EDC 120 may include a column scanner, a row event readout circuit, an address event representation (AER), an event signal processor (hereinafter, referred to as the ESP), and a bias generator.

The column scanner of the EDC 120 may scan the plurality of pixels PX constituting the pixel array in column units. In detail, the column scanner may transmit a selection signal to a column to be scanned among a plurality of columns of the pixel array and scan pixels PX included in the column to be scanned.

The pixels PXs included in the column to be scanned may transmit, to the row event readout circuit, polarity information indicating whether an event in which the intensity of light increases or decreases has occurred, in response to the selection signal.

The row event readout circuit of the EDC 120 may receive the polarity information from the pixels PX included in the column to be scanned. The row event readout circuit may transmit an initialization signal INT to a pixel PX in which an event (e.g., an on-event or off-event) has occurred, in response to the polarity information. The pixel PX in which the event has occurred may be initialized (e.g., reset) in response to the initialization signal INT.

The ESP of the EDC 120 may generate event data EDT based on an address ADDR, polarity information, and a time stamp TS received from the AER.

The interface circuit 130 may receive the event data EDT and transmit vision sensor data VDT to the processor 300 according to a set protocol. The interface circuit 130 may generate vision sensor data VDT by packing the event data EDT and the time stamp in individual signal units, packet units, or frame units according to the set protocol, and transmit the vision sensor data VDT to the processor 300. For example, the interface circuit 130 may include one of an AER interface, a mobile industry processor interface (MIPI), and a parallel interface.

A packet including at least one piece of event data EDT and a time stamp may be output as the vision sensor data VDT from the interface circuit 130. The packet may include a time stamp, an address, and polarity information of the event data EDT, and an arrangement order thereof is not limited. A header indicating the start of a packet may be added to the front end of the packet and a tail indicating the end of the packet may be added to the rear end of the packet. The packet may include at least one event signal.

Figure 3:
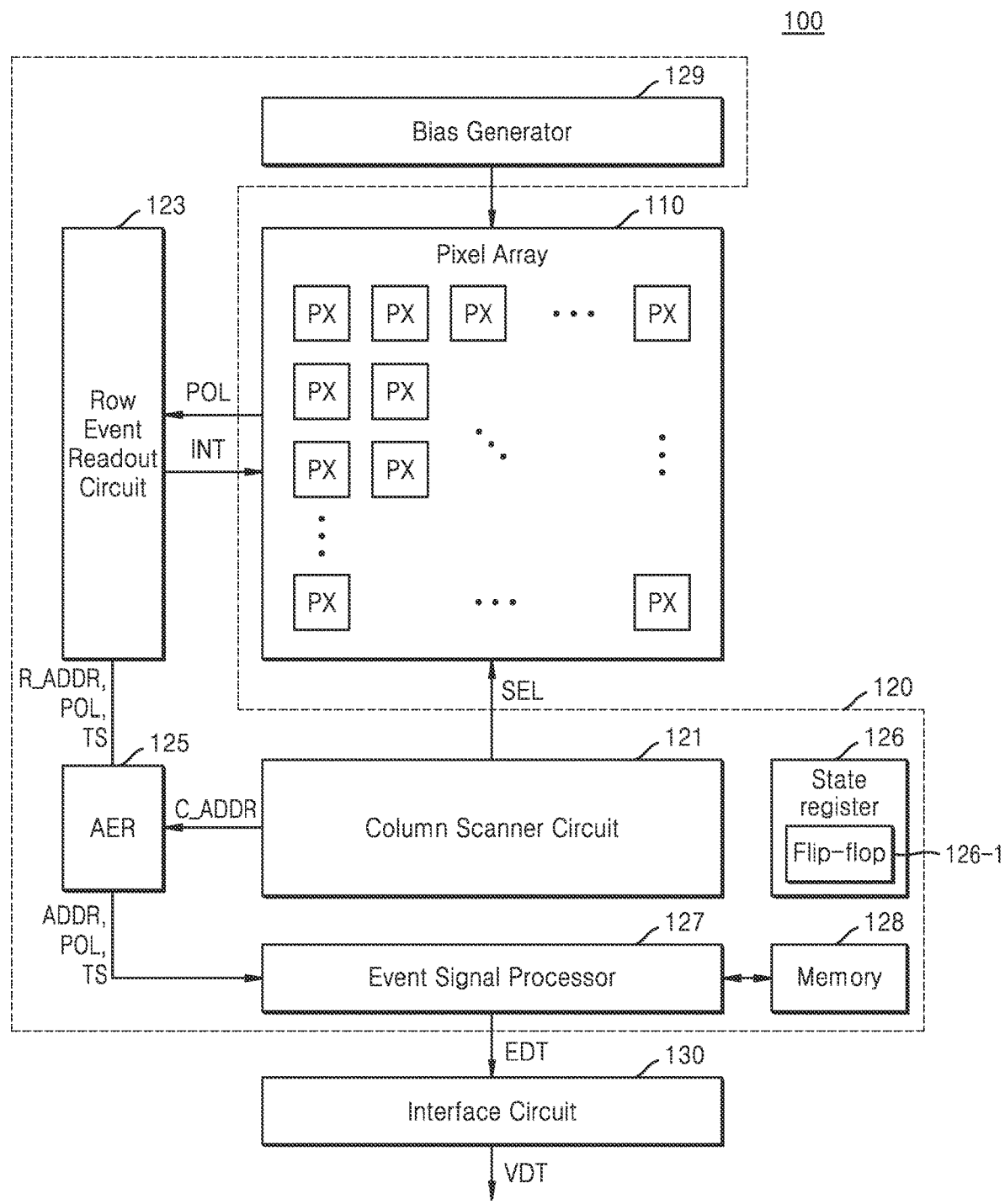
FIG. 3 is a detailed block diagram of the vision sensor of FIG. 2 according to an example embodiment.

FIG. 3 is a detailed block diagram of the vision sensor 100 of FIG. 2.

Referring to FIGS. 2 and 3, the vision sensor 100 may include the pixel array 110, the EDC 120, and the interface circuit 130. The EDC 120 may include a column scanner circuit 121, a row event readout circuit 123, an AER 125, an event signal processor (hereinafter, referred to as the ESP) 127, a memory 128, and a bias generator 129. In addition to the aforementioned components, the vision sensor 100 may additionally include components, such as an event rate controller that adjusts an event detection rate. Because the pixel array 110 and the interface circuit 130 have been described with reference to FIG. 2, redundant descriptions thereof are omitted.

The column scanner circuit 121 may scan a plurality of pixels PX constituting the pixel array 110 in column units. In detail, the column scanner circuit 121 may transmit a selection signal SEL to a column to be scanned among a plurality of columns of the pixel array 110, and scan pixels PX included in the column to be scanned.

The pixels PX included in the column to be scanned may transmit, to the row event readout circuit 123, polarity information POL indicating whether an event in which the intensity of light increases or decreases has occurred, in response to the selection signal SEL. The polarity information POL may include information of an on-event in which the intensity of light increases and an off-event in which the intensity of light decreases. The polarity information POL may include a bit of information regarding whether the on-event has occurred and a bit of information regarding whether the off-event has occurred. In some example embodiments, the pixels PX included in the column to be scanned may transmit, to the row event readout circuit 123, the information regarding whether the event in which the intensity of light increases or decreases has occurred, except for the polarity information POL, in response to the selection signal SEL. In addition, an implementation method of the polarity information POL is not limited to the aforementioned example, and the polarity information POL may be implemented in various methods. Moreover, the column scanner circuit 121 may generate a column address C_ADDR of a pixel PX in which the event has occurred.

The row event readout circuit 123 may receive, from the pixels PX included in the column to be scanned, the information regarding whether the event in which the intensity of light increases or decreases has occurred. In detail, the row event readout circuit 123 may receive, from the pixels PX included in the column to be scanned, the polarity information POL and the information regarding the event has occurred. The row event readout circuit 123 may transmit an initialization signal INT to the pixel PX in which the event (e.g., the on-event or off-event) has occurred, in response to the polarity information POL or the information regarding whether the event has occurred. The pixel PX in which the event has occurred may be initialized (e.g., reset) in response to the initialization signal INT. Also, the row event readout circuit 123 may generate a row address R_ADDR of the pixel PX in which the event has occurred, based on the received polarity information POL or information regarding whether the event has occurred. In addition, the row event readout circuit 123 may generate a time stamp TS including information regarding the time when the event has occurred, based on the polarity information POL or the information regarding whether the event has occurred. In some example embodiments, the time stamp TS may be generated by a time stamper (i.e., a time stamp circuit) provided in the row event readout circuit 123. For example, the time stamper may be implemented using a time tick generated in units of several to tens of microseconds.

The AER 125 may receive the row address R_ADDR, the polarity information POL (or the information regarding whether the event has occurred), and the time stamp TS from the row event readout circuit 123 and receive the column address C_ADDR from the column scanner circuit 121. In addition, the AER 125 may generate an address ADDR of the pixel PX in which the event has occurred, based on the row address R_ADDR and the column address C_ADDR. Moreover, the AER 125 may transmit the address ADDR, the polarity information POL, and the time stamp TS to the ESP 127.

The ESP 127 may generate event data EDT based on the address ADDR, the polarity information POL, and the time stamp TS received from the AER 125. In an example embodiment, the ESP 127 may generate event data EDT for valid events. Also, the ESP 127 may identify flicker in an event in which the intensity of light changes, perform correction to remove an event signal corresponding to the flicker, and generate the event data EDT for valid events. The flicker refers to a phenomenon (e.g., a flickering phenomenon) in which the intensity of light periodically changes due to light emitted from a peripheral lighting device of the image processing system or an external electronic device including a display.

The ESP 127 may map states indicating the presence or absence of an event in the plurality of pixels to corresponding pixels and store the same in a memory. For example, the ESP 127 may map a first state to the pixel when an event has occurred in the pixel, map a second state to the pixel when no event has occurred in the pixel, and store the same in a memory. However, example embodiments are not limited thereto. The ESP 127 may map the state indicating the presence or absence of an event in each of the plurality of pixels to the corresponding pixel, and store the same in a state register 126 constituting the ESP 127. The state register 126 may include a column register and flip-flop 126-1 (including a first flip-flop, and a second flip-flop) for each of the plurality of pixels. But the example embodiments are not limited thereto. The state register 126 according to an example embodiment may include various types of modules, including counters and memories (e.g., SRAM and DRAM), to identify and store the flicker occurrence state and the event occurrence state of the pixel.

The memory may store a state map and may include a plurality of flip-flops. The memory may store the first state as logic high and the second state as logic low. The memory may include the same number of flip-flops as the plurality of pixels. The state map only indicates whether or not an event has occurred in a pixel and thus has 1-bit data per pixel.

The bias generator 129 may generate a voltage that is provided to the pixel array 110. For example, the bias generator 129 may generate threshold voltages or bias voltages used to detect an on-event and an off-event in the pixels PX. The bias generator 129 may change voltage levels of the threshold voltages provided to the pixels PX and may differently change the voltage levels of the threshold voltages for respective pixels PX.

Figure 4:
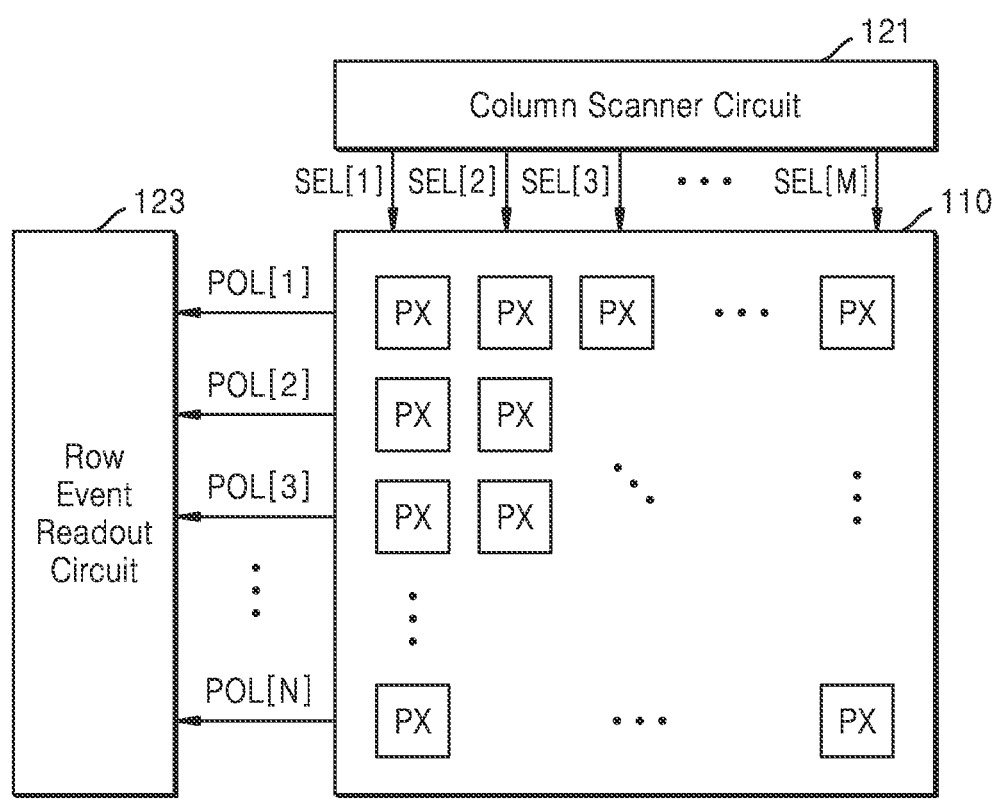
FIG. 4 is a conceptual diagram for describing an operation by which a vision sensor generates polarity information, according to an example embodiment.

FIG. 4 is a conceptual diagram for describing an operation by which a vision sensor generates polarity information, according to an example embodiment.

In detail, FIG. 4 is a conceptual diagram for describing an operation of the vision sensor 100 of FIG. 3 for generating the polarity information POL.

Referring to FIGS. 3 and 4, the column scanner circuit 121 may scan the pixel array 110 in column units. In detail, the column scanner circuit 121 may scan the pixel array 110 in column units by using selection signals SEL[1] to SEL[M] respectively corresponding to M (M is a positive integer) columns. The selection signals SEL[1] to SEL[M] may each have an active level (e.g., logic high) indicating column selection and an inactive level (e.g., logic low) indicating column non-selection. The column scanner circuit 121 may scan the pixel array 110 in column units by sequentially transitioning the selection signals SEL[1] to SEL[M] to active levels. However, example embodiments are not limited thereto. For example, the column scanner circuit 121 may be implemented to transition the selection signals SEL[1] to SEL[M] to active levels in a random order.

When a selection signal in a specific column transitions to an active level, each of N (N is a positive integer) pixels PX included in the corresponding column may provide, to the row event readout circuit 123, polarity information indicating whether an event has occurred. In detail, the N pixels PX may transmit, to the row event readout circuit 123, pieces of polarity information POL[1] to POL[N] respectively corresponding to the N pixels PX. The pieces of polarity information POL[1] to POL[N] may each have an active level (e.g., logic low) indicating that an event has occurred, or an inactive level (e.g., logic high) indicating that no event has occurred. In some example embodiments, each of the pieces of polarity information POL[1] to POL[N] may include first polarity information indicating that an on-event (event in which the change in the intensity of light increases) has occurred or second polarity information indicating that an off-event (event in which the change in the intensity of light decreases) has occurred.

The row event readout circuit 123 may receive the pieces of polarity information POL[1] to POL[N] of the N pixels PX, provide an initialization signal INT to pixels PX in which an event has occurred, based on the pieces of polarity information POL[1] to POL[N], and generate a row address R_ADDR and a time stamp TS.

Figure 5:
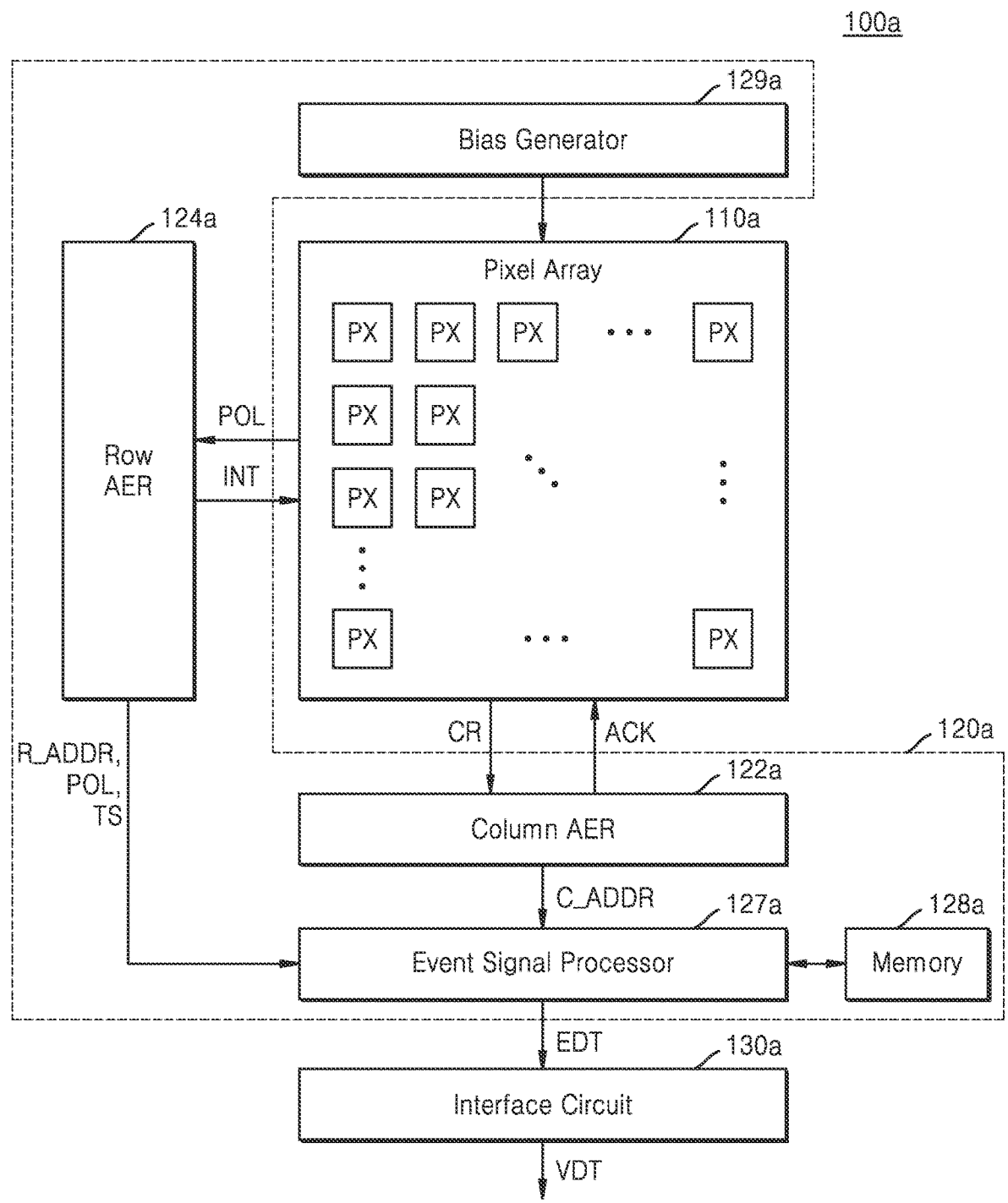
FIG. 5 is a detailed block diagram of the vision sensor of FIG. 2 according to an example embodiment.

FIG. 5 is a detailed block diagram of a vision sensor 100*a* of FIG. 2.

The vision sensor 100*a* of FIG. 5 is a modified example embodiment of the vision sensor 100 of FIG. 3.

Referring to FIG. 5, the vision sensor 100*a* may include a pixel array 110*a*, an EDC 120*a*, and an interface circuit 130*a*, and the EDC 120*a* may include a column AER 122*a*, a row AER 124*a*, a bias generator 129*a*, an ESP 127*a*, and a memory 128*a*. In addition to the aforementioned components, the vision sensor 100*a* may additionally include components, such as an event rate controller that adjusts an event detection rate.

The pixel array 110*a* and the interface circuit 130*a* may respectively correspond to the pixel array 110 and the interface circuit 130 of FIG. 2, and thus, redundant descriptions thereof are omitted. Also, the bias generator 129*a* may correspond to the bias generator 129 of FIG. 3, and thus, redundant descriptions thereof are omitted.

According to an example embodiment, a pixel PX that has detected an event (e.g., an on-event or off-event) among a plurality of pixels PX constituting the pixel array 110*a* may transmit, to the column AER 122*a*, a column request CR that is a signal indicating that an event has occurred.

The column AER 122*a* may receive the column request CR from the pixel PX in which the event has occurred. The column AER 122*a* may transmit a response signal ACK to the pixel PX in which the event has occurred, in response to the received column request CR. Also, the column AER 122*a* may generate a column address C_ADDR of the pixel PX in which the event has occurred, based on the received column request CR.

The pixel PX in which the event has occurred may transmit polarity information POL to the row AER 124*a*, in response to the response signal ACK. Because an implementation example of the polarity information POL may be substantially the same as the description made above with reference to FIG. 3, redundant descriptions thereof are omitted.

The row AER 124*a* may receive the polarity information POL from the pixel PX in which the event has occurred. The row AER 124*a* may transmit an initialization signal INT to the pixel PX in which the event has occurred, in response to the polarity information POL. The pixel PX in which the event has occurred may be initialized (e.g., reset) in response to the initialization signal INT. Also, the row AER 124*a* may generate a row address R_ADDR of the pixel PX in which the event has occurred, based on the received polarity information POL. In addition, the row AER 124*a* may generate a time stamp TS including information regarding the time when the event has occurred, based on the polarity information POL. In some example embodiments, the time stamp TS may be generated by a time stamper provided in the row AER 124*a*. For example, the time stamper may be implemented using a time tick generated in units of several to tens of microseconds.

Operations of the row AER 124*a* and the column AER 122*a* are described with reference to FIG. 5, assuming a case in which information (e.g., the column request CR and the polarity information POL) related to event occurrence is read from the pixel array 110*a* in column units. However, the operations of the row AER 124*a* and the column AER 122*a* are not limited thereto. The row AER 124*a* and the column AER 122*a* may read the information related to event occurrence from the pixel PX in which the event has occurred, using various methods. For example, the information related to event occurrence may be read from the pixel array 110*a* in row units, and the operations of the row AER 124*a* and the column AER 122*a* are exchanged, that is, the column AER 122*a* may receive the polarity information POL and transmit the initialization signal INT to the pixel array 110*a*. Also, the row AER 124*a* and the column AER 122*a* may individually access the pixel PX in which the event has occurred.

The ESP 127*a* may generate event data EDT by identifying and removing flicker based on at least one of the column address C_ADDR, the row address R_ADDR, the degree of event occurrence, the polarity information POL, or the time stamp TS, received from the row AER 124*a* and the column AER 122*a*. In implementing a 640*480 resolution, when the flicker is identified/removed using the time stamp TS (32-bit size), a separate memory (e.g., static random access memory (SRAM)) of 640*480*2*32 bits, that is, 19.66 M bits, may be used.

According to an example embodiment, a vision sensor identifies whether flicker has occurred and whether an event has occurred, removes the flicker based on first and second flip-flops, and generates event data for valid events by using a minimum capacity of flip-flops (or counters or memories) without using a separate memory, such that the performance of an imaging processing system may be improved.

Figure 6:
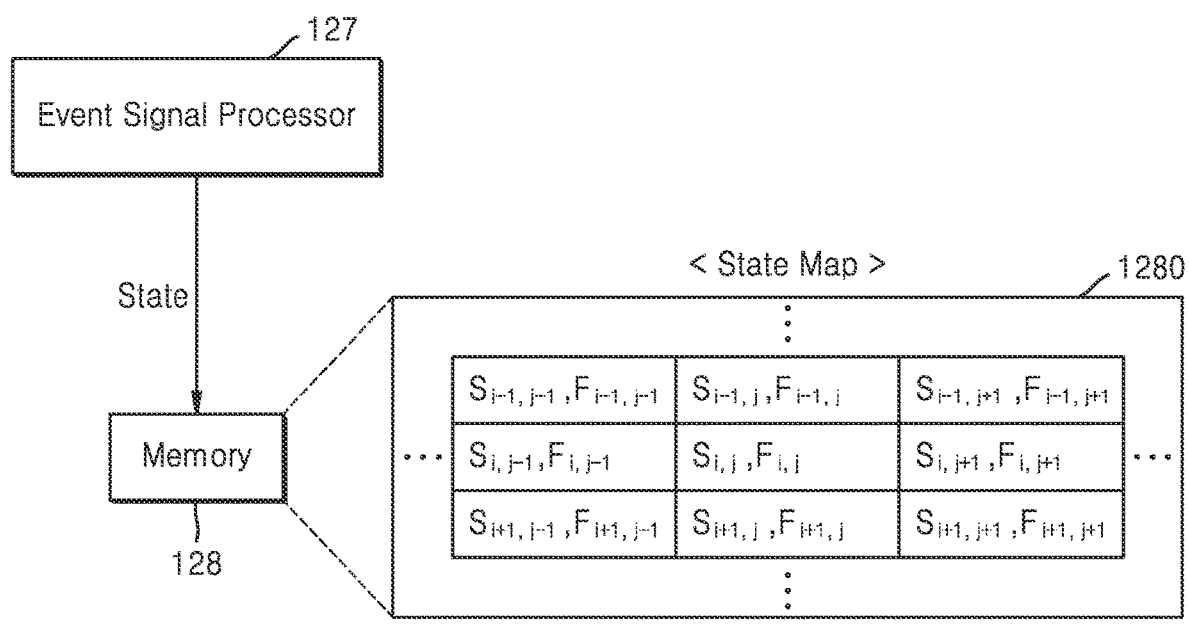
FIG. 6 is a block diagram illustrating an operation by which a vision sensor maps an event state of each of a plurality of pixels to a corresponding pixel and stores the same in a memory, according to an example embodiment.

FIG. 6 is a block diagram illustrating an operation by which the ESP 127 maps an event state of each of a plurality of pixels to a corresponding pixel and stores the same in a memory, according to an example embodiment.

Referring to FIG. 6, the ESP 127 may generate a state map 1280 by using an event signal read from a pixel array. The event signal may include a signal indicating that an event has occurred and polarity information of the event. Example embodiments are not limited thereto, and the polarity information of the event may be omitted. The state map 1280 is stored in the memory 128. The state map 1280 includes coordinates of pixels in which an event has occurred. In $S_{i,j}$ of the state map 1280, i,j denote coordinates of pixels constituting a pixel array, i denotes a row number, and j denotes a column number. S indicates the state indicating whether an event has occurred in each of a plurality of pixels and/or a polarity of the event.

In an example embodiment, the state S indicates whether an event has occurred and may be a first state or a second state. The first state may be indicated by 1 as logic high and the second state may be indicated by 0 as logic low. A pixel in which an event has occurred may be mapped to the first state, and a pixel in which no event has occurred may be mapped to the second state. As a result, the ESP 127 may express and store information regarding whether an event has occurred in each pixel as 1-bit data.

In an example embodiment, the state S indicates whether an event has occurred and a polarity of the event, and may have a first state, a second state, or a third state. The first state may be indicated as '01', which is a 2-bit logic state, the second state may be indicated by '10', which is a 2-bit logic state, and the third state may be indicated by '00', which is a 2-bit logic state. A pixel in which an on-event has occurred may be mapped to the first state, a pixel in which an off-event has occurred may be mapped to the second state, and a pixel in which no event has occurred may be mapped to the third state (e.g., a neutral state or reset state). As a result, the ESP 127 may express and store information regarding whether an event has occurred in each pixel as 2-bit data.

In $F_{i,j}$ of the state map 1280, i,j denote coordinates of pixels constituting a pixel array, i denotes a row number, and j denotes a column number. F indicates the state indicating whether flicker has occurred in each of a plurality of pixels.

In an example embodiment, the state F indicates whether flicker has occurred and may be a first state or a second state. The first state may be indicated by 1 as logic high and the second state may be indicated by 0 as logic low. A pixel in which flicker has occurred may be mapped to the first state and a pixel in which no flicker has occurred may be mapped to the second state. As a result, the ESP 127 may express and store information regarding whether flicker has occurred in each pixel as 1-bit data.

The ESP 127 may generate a state map 1280 for each of the plurality of pixels constituting the pixel array. The memory 128 may require a memory capacity having the same number of bits as the plurality of pixels, and may include a plurality of flip-flops. In detail, the memory 128 may include the same number of flip-flops as the plurality of pixels.

In another example embodiment, the ESP 127 may generate a state map 1280 for some pixels, instead of all of the plurality of pixels constituting the pixel array. For example, an EDC may read an event signal by scanning a plurality of pixels included in a pixel array in row i and column j in column units and process k (k is a natural number less than j) column units as one frame. The k column units may include consecutive columns. Because event signals regarding pixels included in k consecutive columns are read in one frame, the ESP 127 may generate a state map 1280 for the pixels included in the k columns. The number of pixels included in the k columns is i×k, and thus, a memory may require a memory capacity having i×k bits, which is the same number as the number of pixels. In detail, the memory may include the same number of flip-flops as the number of i×k pixels. In an example embodiment, the memory may include k column memories.

However, example embodiments are not limited thereto. The ESP 127 may also map the state indicating whether an event has occurred and/or flicker has occurred in each of the plurality of pixels to the corresponding pixel and store the same in the state register 126 constituting the ESP 127. The state register 126 may include a column register.

The ESP 127 may reset the state map 1280 stored in the memory 128 in each preset reset period. In this regard, when a preset period has elapsed, the ESP 127 may reset the state map 1280 stored in the memory 128. The ESP 127 may map a state (e.g., an event occurrence state and/or flicker occurrence state) of each of the plurality of pixels to 0 and reset the state map 1280 stored in the memory 128.

Figure 7:
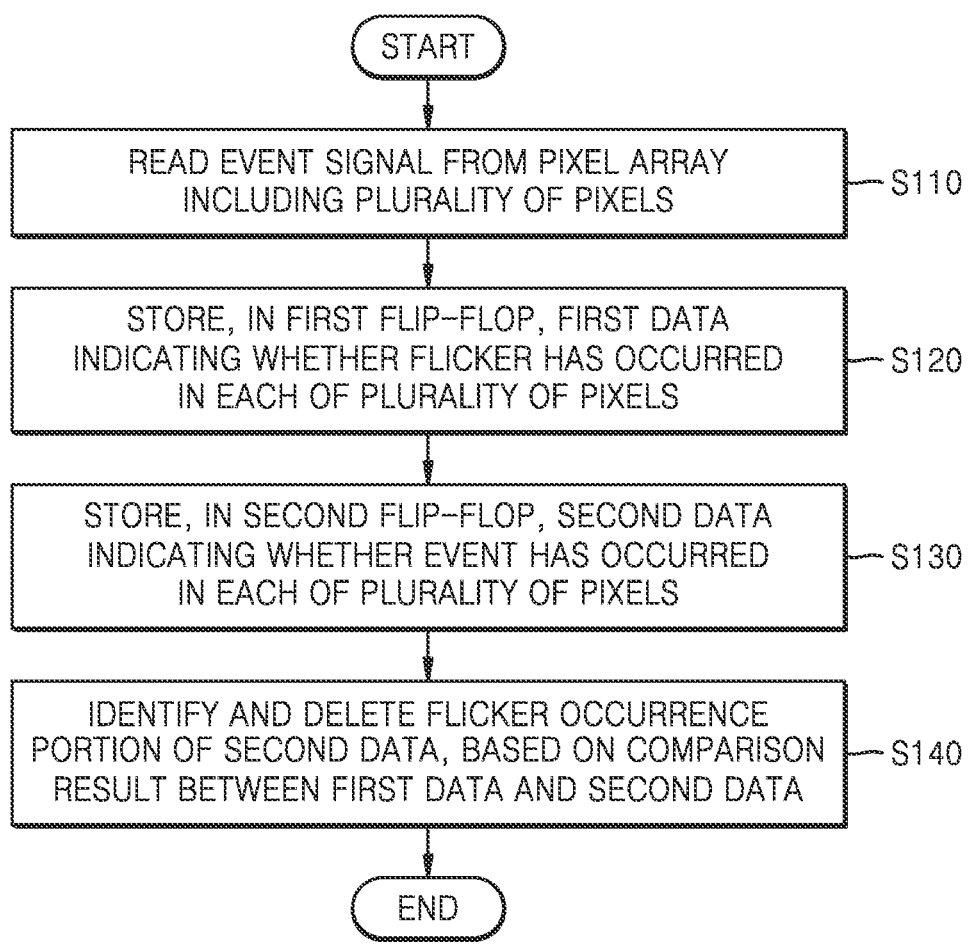
FIG. 7 is a flowchart illustrating an operation by which a vision sensor identifies and removes flicker, according to an example embodiment.

FIG. 7 is a flowchart illustrating an operation by which the vision sensor identifies and removes flicker, according to an example embodiment.

In detail, FIG. 7 is a diagram for describing an operating method of the vision sensor 100 of FIG. 3 for identifying and removing flicker regardless of polarities of detected events.

Referring to FIG. 7, operations, performed by the EDC 120 of the vision sensor 100 in FIG. 3, of identifying flicker regardless of polarities of events and removing the flicker accordingly may include operations S110, S120, S130, and S140.

In operation S110, the EDC 120 of the vision sensor 100 may read an event signal from a pixel array including a plurality of pixels.

In an example embodiment, as described above with reference to FIG. 3, the EDC 120 may read an event signal based on a "synchronous method" of periodically scanning a plurality of pixels constituting the pixel array 110 in column units by using the selection signal SEL.

In an example embodiment, as described above with reference to FIG. 5, the EDC 120 may read an event signal based on an "asynchronous method" of scanning a corresponding pixel when a signal indicating that an event has occurred is received from a pixel that detects an event (e.g., an on-event or off-event) among the plurality of pixels constituting the pixel array 110.

The EDC 120 may include a first flip-flop and a second flip-flop for each of the plurality of pixels In operation S120, the EDC 120 may store, in the first flip-flops, first data indicating whether flicker has occurred in each of the plurality of pixels.

In an example embodiment, when there is another event that has occurred within a specific period of time (e.g., one reset period) before a target event is detected, the EDC 120 may identify occurrence of the target event as occurrence of flicker.

In this case, the first flip-flop may be implemented as a 1-bit flip-flop (e.g., a delayed flip-flop) and may store the first data including information about a first state corresponding to occurrence of flicker in each of the plurality of pixels and information about a second state corresponding to no occurrence of flicker. An operation of storing a flicker occurrence state of each of the plurality of pixels based on the first flip-flop are described in detail with reference to FIGS. 8A and 8B below.

In operation S130, the EDC 120 may store, in the second flip-flops, second data indicating whether an event has occurred in each of the plurality of pixels. In this case, the event may include all events that have occurred in the plurality of pixels regardless of polarities of the events. That is, the event may include both an on-event and an off-event of each of the plurality of pixels.

In this case, the second flip-flop may be implemented as a 1-bit flip-flop and may store the second data including information about a third state corresponding to occurrence of an event in each of the plurality of pixels and information about a fourth state corresponding to no occurrence of an event. An operation of storing an event occurrence state of each of the plurality of pixels based on the second flip-flop are described in detail with reference to FIGS. 8A and 8B below.

In operation S140, the EDC 120 may identify and delete a flicker occurrence portion of the second data, based on a comparison result between the first data and the second data. For example, the EDC 120 may identify a portion of the second data corresponding to the flicker occurrence state of the first data, as the flicker occurrence portion, and delete (or reset) the same.

When a state register 126 of the EDC 120 in FIG. 7 is configured with a 2-bit flip-flop (e.g., the first and second flip-flop) to store the event occurrence state and the flicker occurrence state of each of the plurality of pixels at a 640*480 resolution (assuming that 10 gate counters (G/C) is required per flip-flop), the required size of storage may be "640*480*10 G/C*2=6M G/C". In this case, when the state register 126 is configured with a 2-bit flip-flop (e.g., the first and second flip-flops) by binning the plurality of pixels, the required size of storage may further decrease.

Although it has been described that the state register 126 of the EDC 120 in FIG. 7 includes the first flip-flop and the second flip-flop to identify/store a flicker occurrence state and an event occurrence state of a target pixel, example embodiments are not limited thereto. The state register 126 of the EDC 120 according to an example embodiment may include various types of modules, including counters and memories (e.g., SRAM and dynamic RAM (DRAM)), to identify/store the flicker occurrence state and the event occurrence state of the target pixel. For example, when the state register 126 is configured with a 2-bit counter at the 640*480 resolution (assuming that 10 G/C is required per flip-flop), the required size may be "640*480*2*10 G/C=6M G/C". For example, when the state register 126 is configured with 2-bit SRAM at the 640*480 resolution, the required size may be "640*480*2 bit=0.6M bits".

An operation of identifying flicker regardless of polarities of events based on the first flip-flop and the second flip-flop and removing the flicker is described with reference to FIGS. 8A and 8B below.

Figure 8A:
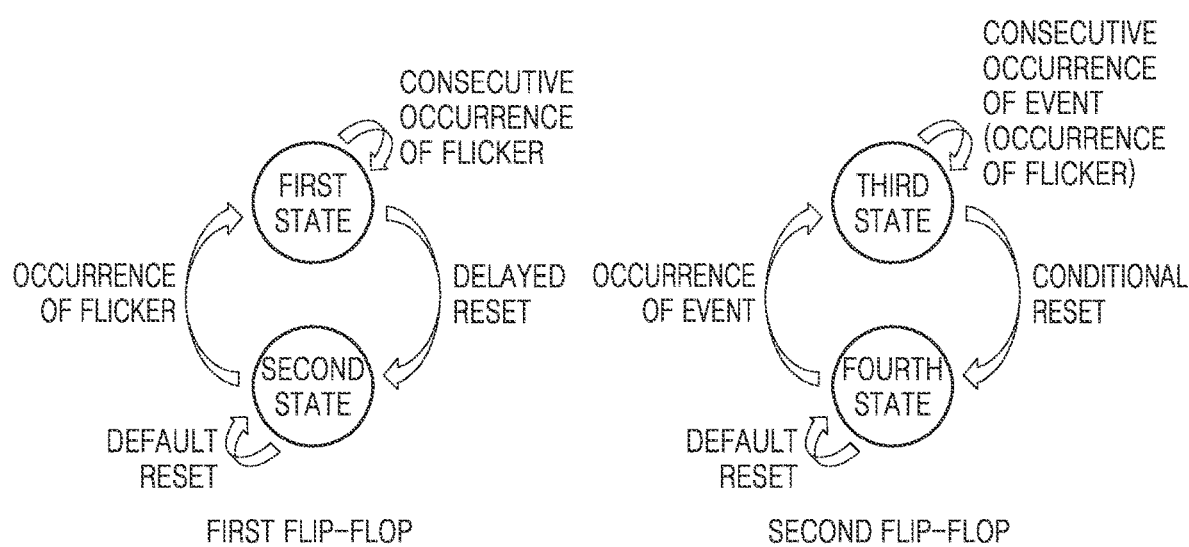
FIG. 8A is a state diagram illustrating an operation by which a vision sensor stores an event state of each of a plurality of pixels and a flicker state, according to an example embodiment.

FIG. 8A is a state diagram illustrating an operation by which a vision sensor stores an event state of each of a plurality of pixels and a flicker state, according to an example embodiment.

In detail, FIG. 8A is a state diagram indicating a flicker state and an event state of each of the plurality of pixels PX constituting the pixel array 110. As shown, the state diagram indicates whether flicker has occurred and whether an event has occurred in each of the plurality of pixels PX, for example based on determinations made in operations S120 to S140 of FIG. 7.

In FIG. 8A, it is assumed that, when there is another event that has occurred (regardless of the polarity of the event), within a specific period of time (e.g., one reset period) before the EDC 120 detects a target event, the EDC 120 identifies the target event as flicker. That is, when an event consecutively occurs regardless of the polarity of the event within the specific period of time (e.g., one reset period), the event may be identified as flicker.

Referring to FIG. 8A, the EDC 120 of the vision sensor 100 may include the state register 126, and the state register 126 may include a first flip-flop in which first data indicating whether flicker has occurred is stored, and a second flip-flop in which second data indicating whether an event has occurred is stored. The first flip-flop may be implemented as a 1-bit flip-flop (e.g., a delayed flip-flop) and the second flip-flop may be implemented as a 1-bit flip-flop.

In an example embodiment, the EDC 120 may identify whether flicker has occurred in a target pixel among the plurality of pixels. For example, when it is identified that flicker has occurred in the target pixel, the EDC 120 may store, in the first flip-flop, the first data indicating the target pixel is mapped to the first state corresponding to occurrence of flicker. In contrast, when it is identified that no flicker has occurred in the target pixel, the EDC 120 may store, in the first flip-flop, the first data indicating the target pixel is mapped to the second state corresponding to no occurrence of flicker. For example, the first flip-flop may store the first state as logic high (e.g., a 1-bit logic state "1") and store the second state as logic low (e.g., a 1-bit logic state "0"). The state register 126 may include the same number of first flip-flops as the number of pixels.

In an example embodiment, the EDC 120 may reset the first data by transmitting, to the first flip-flop, a first reset signal for resetting the first data in each preset reset period. In this case, the EDC 120 may perform a delayed reset when the target pixel is in the first state and perform a default reset (e.g., initialize/reset a flicker state of the target pixel to "0") when the target pixel is in the second state. In this regard, the "delayed reset" may mean that the first flip-flop performs reset by delaying the first reset signal to a period following a period in which the first reset signal is received. For example, data (e.g., the first data) for the flicker state of the target pixel stored in the first flip-flop may be reset in a reset period following the period in which the first reset signal is received from the EDC 120, according to the delayed reset (e.g., a 1-clock delayed reset). The EDC 120 may identify flicker (e.g., flicker caused by turning on a surrounding lighting) in which brightness of light changes at a relatively long period through a delayed reset of the first data of the target pixel.

For example, the EDC 120 may generate a first reset signal, which is a reset signal of a second period when a preset first period has elapsed, and transmit the first reset signal to the first flip-flop, and the first flip-flop may perform a delayed reset of resetting the first data in a third reset period, which is a period following a period in which the first reset signal of the second period is received. However, when another flicker signal has occurred in a second reset period, the first flip-flop may not perform the delayed reset but maintain the first data regardless of the first reset signal of the reset signal 820 of the second period.

In an example embodiment, the EDC 120 may identify whether an event has occurred in the target pixel among the plurality of pixels. For example, when it is identified that an event has occurred in the target pixel, the EDC 120 may store, in the second flip-flop, the second data indicating the target pixel is mapped to the third state corresponding to occurrence of an event. In contrast, when it is identified that no event has occurred in the target pixel, the EDC 120 may store, in the second flip-flop, the second data indicating the target pixel is mapped to the fourth state corresponding to no occurrence of an event. For example, the first flip-flop may store the third state as logic high and store the fourth state as logic low. The state register 126 may include the same number of second flip-flops as the plurality of pixels.

In an example embodiment, the EDC 120 may reset the second data by transmitting, to the second flip-flop, a second reset signal for resetting the second data in each preset reset period. In this case, the EDC 120 may perform a reset according to conditions (hereinafter, referred to as "conditional reset") when the target pixel is in the third state and perform a default reset (e.g., initialize/reset an event state of the target pixel to "0") when the target pixel is in the fourth state.

Data (e.g., the second data) for the event state of the target pixel stored in the second flip-flop may be reset in a period in which the second reset signal is received from the EDC 120, when a first condition and a second condition are satisfied. In this regard, the "first condition" may mean that a reset signal is received from the EDC 120, and the "second condition" may mean that the first flip-flop is in the second state (e.g., a state in which no flicker has occurred in the target pixel) at a time point when a reset signal is received.

Although the state register 126 of the EDC 120 of the vision sensor 100 in FIG. 8A has been described as including the first flip-flop and the second flip-flop to identify and store the flicker occurrence state and the event occurrence state of the target pixel, example embodiments are not limited thereto. The state register 126 of the EDC 120 according to an example embodiment may include various types of modules, including counters and memories (e.g., SRAM and DRAM), to identify and store the flicker occurrence state and the event occurrence state of the target pixel.

Figure 8B:
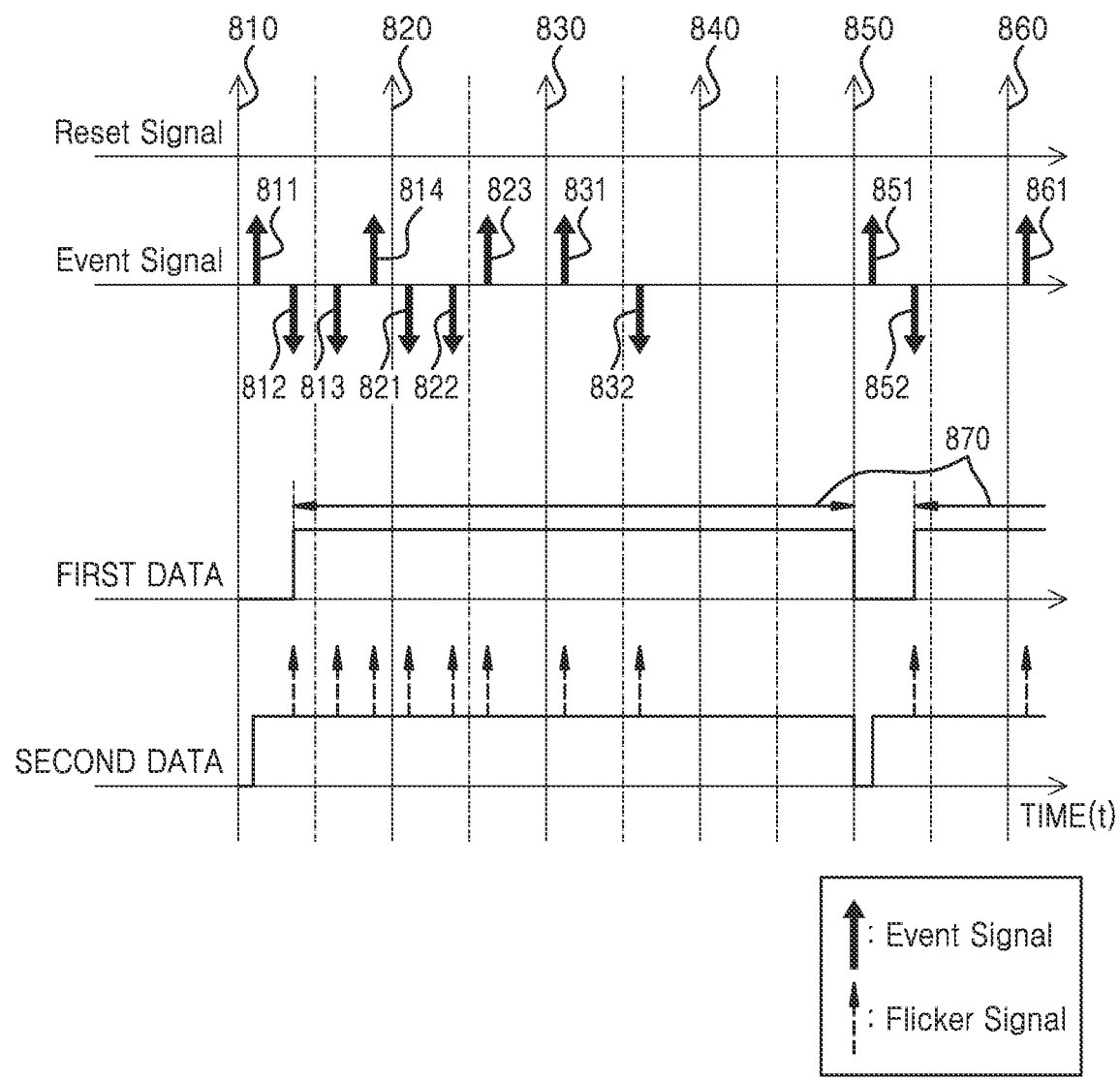
FIG. 8B is a timing diagram of an operation by which a vision sensor stores the event state and the flicker state in FIG. 8A, according to an example embodiment.

FIG. 8B is a timing diagram of an operation by which a vision sensor stores the event state and the flicker state in FIG. 8A, according to an example embodiment.

In detail, FIG. 8B is a timing diagram for the first data stored in the first flip-flop of the state register 126 and the second data stored in the second flip-flop of the state register 126 in FIG. 8A.

In FIG. 8B, it is assumed that, when there is another event that has occurred regardless of the polarity of the event, within a specific period of time (e.g., one reset period) before the EDC 120 detects a target event, the EDC 120 identifies the target event as flicker. That is, when an event consecutively occurs within the specific period of time (e.g., one reset period) regardless of the polarity of the event, the EDC 120 may identify the event as flicker.

Also, the EDC 120 may generate a reset signal when a preset reset period has elapsed and transmit the reset signal to the first flip-flop and the second flip-flop. In this case, the reset signal may include a first reset signal for resetting the first data of the first flip-flop and a second reset signal for resetting the second data of the second flip-flop. The reset period refers to a period from a time point when a reset signal is received to a time point when a next reset signal is received. For example, a first reset period may refer to a period from a time point when a reset signal 810 of a first period is received to a time point when a reset signal 820 of a second period is received, and a second reset period may refer to a period from a time point when the reset signal 820 of the second period is received to a time point when a reset signal 830 of a third period is received.

Referring to FIG. 8B, the horizontal axis of the timing diagram may indicate time (t), and the vertical axis may include first data indicating a state of a reset signal, a state of an event signal, and a flicker occurrence state of a target pixel over time, and second data indicating an event occurrence state. Also, a solid line arrow in the timing diagram means that an event signal has occurred, and a dotted line arrow means that flicker has occurred.

Referring to FIGS. 8A and 8B, the EDC 120 may detect generation of a first event signal 811 to a fourth event signal 814 during the first reset period (e.g., the first reset period refers to the period from the time point when the reset signal 810 of the first period is received to the time point when the reset signal 820 of the second period is received). At a time point when the first event signal 811 is generated, the EDC 120 may change a state of the second data from the fourth state (e.g., a logic low state) to the third state (e.g., a logic high state) and store the second data in the second flip-flop. At a time point when a second event signal 812 is generated, the EDC 120 may change a state of the first data from the second state (e.g., the logic low state) to the first state (e.g., the logic high state) and store the first data in the first flip-flop, and may maintain the state of the second data in the third state (e.g., the logic high state) and store the second data in the second flip-flop. At a time point when a third event signal 813 is generated, the EDC 120 may maintain the state of the first data in the first state (e.g., the logic high state) and store the first data in the first flip-flop, and may maintain the state of the second data in the third state (e.g., the logic high state) and store the second data in the second flip-flop. At a time point when the fourth event signal 814 is generated, the EDC 120 may maintain the state of the first data in the first state (e.g., the logic high state) and store the first data in the first flip-flop, and may maintain the state of the second data in the third state (e.g., the logic high state) and store the second data in the second flip-flop.

The EDC 120 may generate a reset signal 820 (e.g., the first reset signal) of a second period when a preset first reset period has elapsed, and transmit the reset signal 820 to the first flip-flop. The first flip-flop may perform a delayed reset on the first data at the third reset period (e.g., the time point when the reset signal 830 of the third period is received), which is a period following a period in which the reset signal 820 (e.g., the first reset signal) of the second period is received.

However, because another flicker signal has occurred in the first reset period, the first flip-flop may not perform the delayed reset but maintain the first data regardless of the reset signal 810 (e.g., the first reset signal) of the first period.

The EDC 120 may generate the reset signal 820 (e.g., the second reset signal) of the second period when the preset first reset period has elapsed, and transmit the reset signal 820 to the second flip-flop. Because the first flip-flop is not in the fourth state (e.g., the logic low state) at the time point when the reset signal 820 (e.g., the second reset signal) of the second period is received (that is, the conditions of the conditional reset are not satisfied), the second flip-flop does not perform a reset and maintains the second data.

The EDC 120 may detect generation of a fifth event signal 821 to a seventh event signal 823 during the second reset period (e.g., the second reset period refers to the period from the time point when the reset signal 820 of the second period is received to the time point when the reset signal 830 of a third period is received). At a time point when the fifth event signal 821 is generated, the EDC 120 may maintain the state of the first data in the first state (e.g., the logic high state) and store the first data in the first flip-flop, and may maintain the state of the second data in the third state (e.g., the logic high state) and store the second data in the second flip-flop. At a time point when a sixth event signal 822 is generated, the EDC 120 may maintain the state of the first data in the first state (e.g., the logic high state) and store the first data in the first flip-flop, and may maintain the state of the second data in the third state (e.g., the logic high state) and store the second data in the second flip-flop. At a time point when the seventh event signal 823 is generated, the EDC 120 may maintain the state of the first data in the first state (e.g., the logic high state) and store the first data in the first flip-flop, and may maintain the state of the second data in the third state (e.g., the logic high state) and store the second data in the second flip-flop.

The EDC 120 may generate a reset signal 830 (e.g., the first reset signal) of a third period when a preset second reset period has elapsed, and transmit the reset signal 830 to the first flip-flop. The first flip-flop may perform a delayed reset on the first data at a fourth reset period (e.g., a time point when a reset signal 830 of a fourth period is received), which is a period following a period in which the reset signal 830 (e.g., the first reset signal) of the third period is received.

However, because another flicker signal has occurred in the second reset period, the first flip-flop may not perform the delayed reset but maintain the first data regardless of the reset signal 820 (e.g., the first reset signal) of the second period.

The EDC 120 may generate the reset signal 830 (e.g., the second reset signal) of the third period when the preset second reset period has elapsed, and transmit the reset signal 830 to the second flip-flop. Because the first flip-flop is not in the fourth state (e.g., the logic low state) at the time point when the reset signal 830 (e.g., the second reset signal) of the third period is received (that is, the conditions of the conditional reset are not satisfied), the second flip-flop does not perform a reset and maintains the second data.

The EDC 120 may detect generation of an eighth event signal 831 and a ninth event signal 832 during the third reset period (e.g., the third reset period refers to a period from the time point when the reset signal 830 of the third period is received to a time point when a reset signal 840 of a fourth period is received). At a time point when the eighth event signal 831 is generated, the EDC 120 may maintain the state of the first data in the first state (e.g., the logic high state) and store the first data in the first flip-flop, and may maintain the state of the second data in the third state (e.g., the logic high state) and store the second data in the second flip-flop. At a time point when the ninth event signal 832 is generated, the EDC 120 may maintain the state of the first data in the first state (e.g., the logic high state) and store the first data in the first flip-flop, and may maintain the state of the second data in the third state (e.g., the logic high state) and store the second data in the second flip-flop.

The EDC 120 may generate the reset signal 840 (e.g., the first reset signal) of the fourth period when a preset third reset period has elapsed, and transmit the reset signal 840 to the first flip-flop. The first flip-flop may perform a delayed reset on the first data at a fifth reset period (e.g., a time point when a reset signal 850 of a fifth period is received), which is a period following a period in which the reset signal 840 (e.g., the first reset signal) of the fourth period is received.

However, because another flicker signal has occurred in the third reset period, the first flip-flop may not perform the delayed reset but maintain the first data regardless of a reset signal 820 of a third period (e.g., the first reset signal).

The EDC 120 may generate the reset signal 840 (e.g., the second reset signal) of the fourth period when the preset third reset period has elapsed, and transmit the reset signal 840 to the second flip-flop. Because the first flip-flop is not in the fourth state (e.g., the logic low state) at the time point when the reset signal 840 (e.g., the second reset signal) of the fourth period is received (that is, the conditions of the conditional reset are not satisfied), the second flip-flop does not perform a reset and maintains the second data.

The EDC 120 may not detect generation of an event signal during the fourth reset period (e.g., the fourth reset period refers to a period from the time point when the reset signal 840 of the fourth period is received to the time point when the reset signal 850 of the fifth period is received). The EDC 120 may maintain the first data and the second data of the third reset period, which is a previous period, due to the delayed reset and the conditional reset.

The EDC 120 may generate the reset signal 850 (e.g., the first reset signal) of the fifth period when a preset fourth reset period has elapsed, and transmit the reset signal 850 to the first flip-flop. The first flip-flop may perform a delayed reset on the first data at a sixth reset period (e.g., a time point when a reset signal 860 of a sixth period is received), which is a period following a period in which the reset signal 850 (e.g., the first reset signal) of the fifth period is received.

In contrast, as for the fourth reset period, because another flicker signal has not occurred in the fourth reset period, the first flip-flop may change to the fourth state by performing a delayed reset on the first data at the fifth reset period (e.g., the time point when the reset signal 850 of the fifth period is received) according to the reset signal 840 (e.g., the first reset signal) of the fourth period.

The EDC 120 may generate the reset signal 850 (e.g., the second reset signal) of the fifth period when the preset fourth reset period has elapsed, and transmit the reset signal 850 to the second flip-flop. Because the first flip-flop is in the fourth state (e.g., the logic low state) at the time point when the reset signal 850 (e.g., the second reset signal) of the fifth period is received (that is, the conditions of the conditional reset are satisfied), the second flip-flop may reset the second data and change to the second state.

The EDC 120 may detect generation of a tenth event signal 851 and an eleventh event signal 852 during the fifth reset period (e.g., the fifth reset period refers to a period from the time point when the reset signal 850 of the fifth period is received to the time point when the reset signal 860 of the sixth period is received). At a time point when the tenth event signal 851 is generated, the EDC 120 may change the state of the second data from the fourth state (e.g., a logic low state) to the third state (e.g., the logic high state) and store the second data in the second flip-flop. At a time point when the eleventh event signal 852 is generated, the EDC 120 may change the state of the first data from the second state (e.g., the logic low state) to the first state (e.g., the logic high state) and store the first data in the first flip-flop, and may maintain the state of the second data in the third state (e.g., the logic high state) and store the second data in the second flip-flop.

The EDC 120 may generate the reset signal 860 (e.g., the first reset signal) of the sixth period when a preset fifth reset period has elapsed, and transmit the reset signal 860 to the first flip-flop. The first flip-flop may perform a delayed reset on the first data at a seventh reset period (e.g., a time point when a reset signal of a seventh period is received), which is a period following a period in which the reset signal 860 (e.g., the first reset signal) of the sixth period is received.

However, because another flicker signal has occurred in the fifth reset period, the first flip-flop may not perform the delayed reset but maintain the first data regardless of the reset signal 850 (e.g., the first reset signal) of the fifth period.

The EDC 120 may generate the reset signal 860 (e.g., the second reset signal) of the sixth period when the preset fifth reset period has elapsed, and transmit the reset signal 860 to the second flip-flop. Because the first flip-flop is not in the fourth state (e.g., the logic low state) at the time point when the reset signal 860 (e.g., the second reset signal) of the sixth period is received (that is, the conditions of the conditional reset are not satisfied), the second flip-flop does not perform a reset and maintains the second data.

The EDC 120 may detect generation of a twelfth event signal 861 during the sixth reset period (e.g., the sixth reset period refers to a period from the time point when the reset signal 860 of the sixth period is received to the time point when the reset signal of the seventh period is received). At a time point when the twelfth event signal 861 is generated, the EDC 120 may maintain the state of the first data in the first state (e.g., the logic high state) and store the first data in the first flip-flop, and may maintain the state of the second data in the third state (e.g., the logic high state) and store the second data in the second flip-flop.

The EDC 120 may identify a portion 870 of the first data corresponding to the first state that is the logic high state, as a state in which flicker has occurred in the target pixel. The EDC 120 may generate event data EDT for valid events, by comparing the first data with the second data and removing a portion of the second data corresponding to the portion 870 (e.g., a flicker occurrence portion) of the first data corresponding to the first state.

As described above, according to an example embodiment, the vision sensor identifies whether flicker has occurred and whether an event has occurred, removes the flicker based on the first and second flip-flops, and generates event data for valid events using a minimum capacity without using a separate memory, such that the performance of the imaging processing system may be improved.

Although the EDC 120 of the vision sensor 100 in FIG. 8B has been described that the state register 126 includes the first flip-flop and the second flip-flop to identify and store the flicker occurrence state and the event occurrence state of the target pixel, example embodiments are not limited thereto. The state register 126 of the EDC 120 according to an example embodiment may include various types of modules, including counters and memories (e.g., SRAM and DRAM), to identify and store the flicker occurrence state and the event occurrence state of the target pixel.

Figure 9:
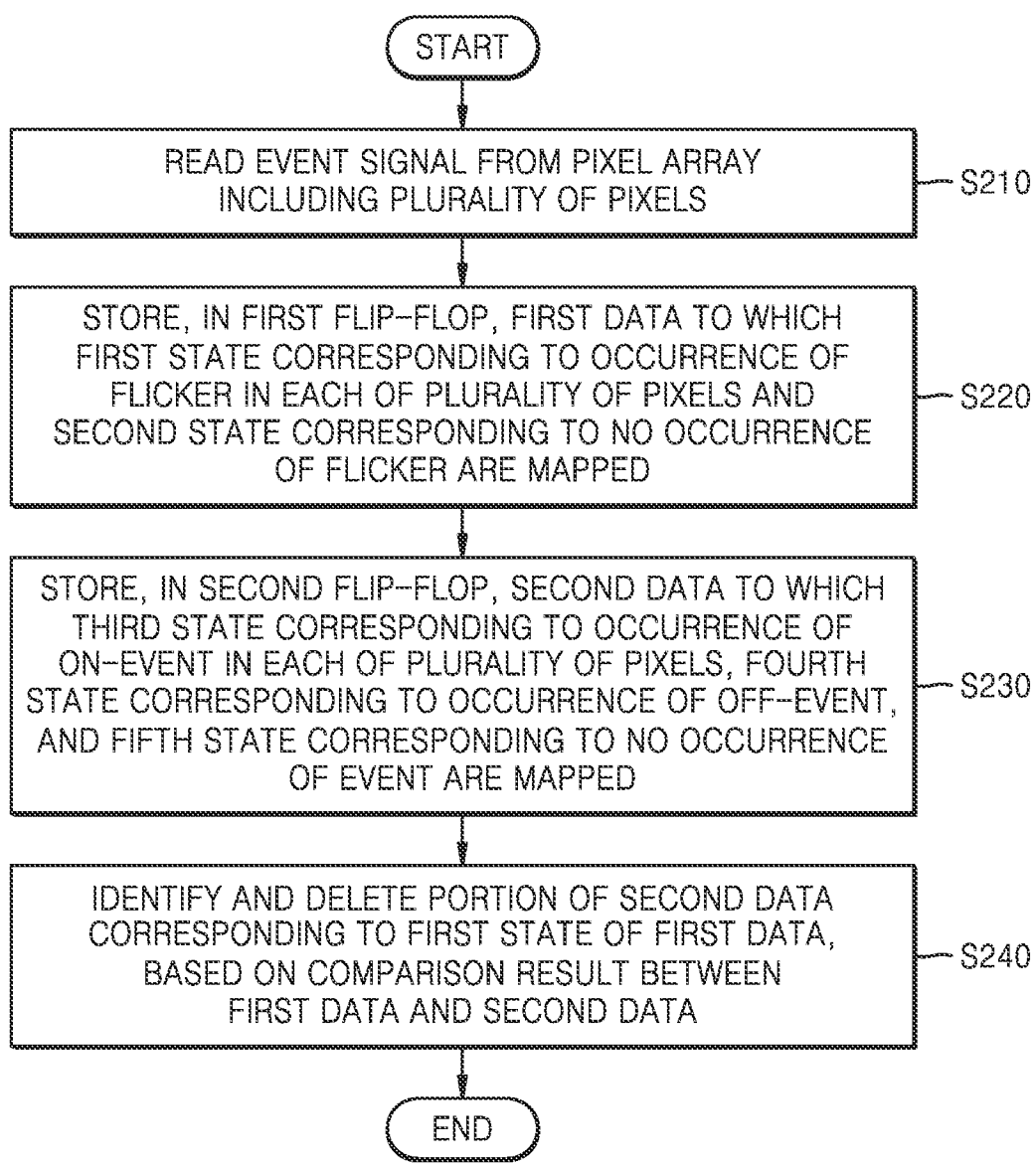
FIG. 9 is a flowchart illustrating an operation by which a vision sensor identifies and removes flicker, according to another example embodiment.

FIG. 9 is a flowchart illustrating an operation by which the vision sensor identifies and removes flicker, according to another example embodiment.

In detail, FIG. 9 is a diagram for describing an operating method of the vision sensor 100 of FIG. 3 for identifying and removing flicker by distinguishing polarities (e.g., an on-event or off-event) of detected events.

Referring to FIG. 9, operations, performed by the EDC 120 of the vision sensor 100 in FIG. 3, of identifying flicker by distinguishing polarities of events, and removing the flicker accordingly may include operations S210, S220, S230, and S240.

In operation S210, the EDC 120 of the vision sensor 100 may read an event signal from a pixel array including a plurality of pixels.

In an example embodiment, as described above with reference to FIG. 3, the EDC 120 may read an event signal based on the "synchronous method" of periodically scanning a plurality of pixels constituting the pixel array 110 in column units by using the selection signal SEL.

In an example embodiment, as described above with reference to FIG. 5, the EDC 120 may read an event signal based on the "asynchronous method" of scanning a corresponding pixel when a signal indicating that an event has occurred is received from a pixel that detects an event (e.g., an on-event or off-event) among the plurality of pixels constituting the pixel array 110.

In operation S220, the EDC 120 of the vision sensor 100 may store, in the first flip-flop, first data to which a first state corresponding to occurrence of flicker in each of the plurality of pixels and a second state corresponding to no occurrence of flicker are mapped.

In an example embodiment, when there is an event with a different polarity of the event that has occurred within a specific period of time (e.g., one reset period) before a target event is detected, the EDC 120 may identify occurrence of the target event as occurrence of flicker. For example, when a target event that is an on-event consecutively occurs after an off-event has occurred within a previous specific period of time (e.g., one reset period), the EDC 120 may identify the occurrence of the target event as the occurrence of flicker. When a target event that is an off-event consecutively occurs after an on-event has occurred within a previous specific period of time (e.g., one reset period), the EDC 120 may identify the occurrence of the target event as the occurrence of flicker.

For example, the first flip-flop may be implemented as a 1-bit flip-flop (e.g., a delayed flip-flop). An operation of storing a flicker occurrence state of each of the plurality of pixels based on the first flip-flop is described in detail with reference to FIGS. 10A and 10B below.

In operation S230, the EDC 120 of the vision sensor 100 may store, in the second flip-flop, second data to which a third state corresponding to occurrence of an on-event in each of the plurality of pixels, a fourth state corresponding to occurrence of an off-event, and a fifth state corresponding to no occurrence of an event are mapped.

When an event in which the intensity of light increases has occurred, the EDC 120 of the vision sensor 100 may identify the event as an on-event corresponding thereto. In contrast, when an event in which the intensity of light decreases has occurred, the EDC 120 may identify the event as an off-event.

In this case, the second flip-flop may be implemented as a 2-bit flip-flop. An operation of storing an event occurrence state of each of the plurality of pixels based on the second flip-flop is described in detail with reference to FIGS. 10A and 10B below.

In operation S240, the EDC 120 of the vision sensor 100 may identify and delete a portion of the second data corresponding to the first state of the first data, based on a comparison result between the first data and the second data. For example, the EDC 120 may identify a portion (e.g., the first state) of the second data corresponding to a flicker occurrence state of the first data, as a flicker occurrence portion, and delete (or reset) the same.

When a state register 126 of the EDC 120 in FIG. 9 is configured with a 3-bit flip-flop (e.g., the first and second flip-flop) to store the event occurrence state and the flicker occurrence state of each of the plurality of pixels at a 640*480 resolution (assuming that 10 G/C is required per flip-flop), the required size of storage may be "640*480*10 G/C*3=9M G/C". In this case, when the state register 126 is configured with a 2-bit flip-flop (e.g., the first and second flip-flops) by binning the plurality of pixels, the required size of storage may be smaller.

Although it has been described that the state register 126 of the EDC 120 in FIG. 9 includes the first flip-flop and the second flip-flop to identify/store a flicker occurrence state and an event occurrence state of a target pixel, example embodiments are not limited thereto. The state register 126 of the EDC 120 according to an example embodiment may include various types of modules, including counters and memories (e.g., SRAM and DRAM), to identify/store the flicker occurrence state and the event occurrence state of the target pixel. For example, when the state register 126 is configured with a 2-bit counter at the 640*480 resolution (assuming that 10 G/C is required per flip-flop), the required size may be "640*480*2*10 G/C=6M G/C". For example, the state register 126 is configured with 2-bit SRAM at the 640*480 resolution, the required size may be "640*480*2 bit=0.6M bits".

An operation of identifying flicker by distinguishing polarities of events based on the first flip-flop and the second flip-flop and removing the flicker is described with FIGS. 10A and 10B described below.

Figure 10A:
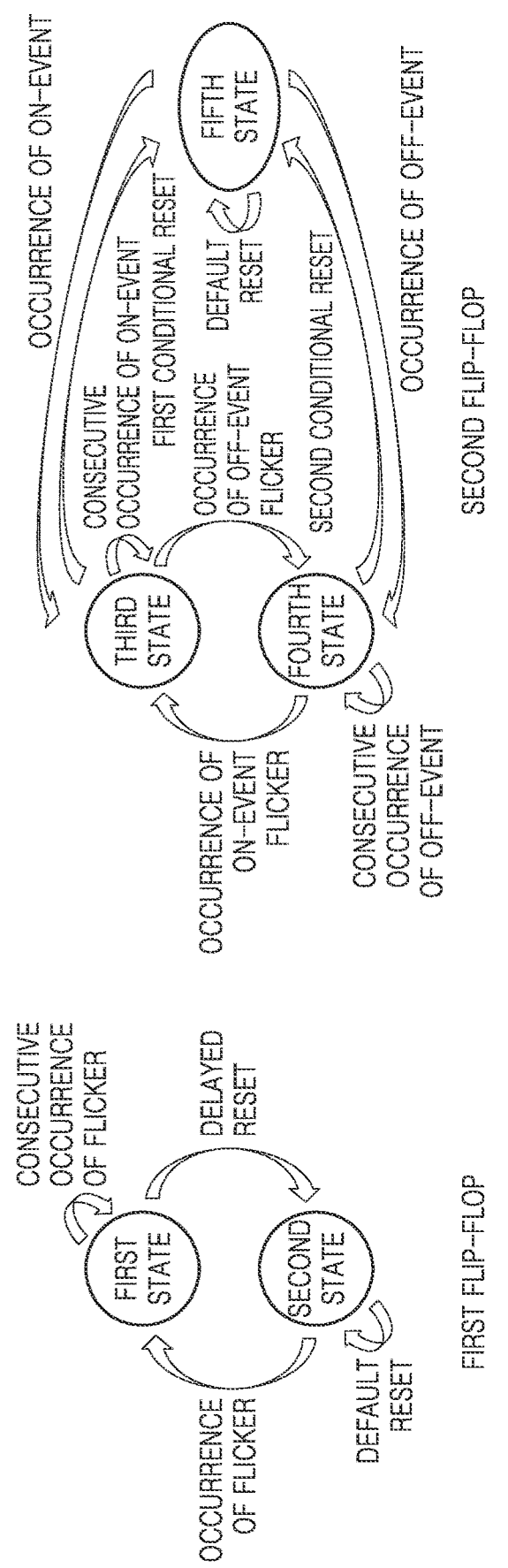
FIG. 10A is a state diagram illustrating an operation by which a vision sensor stores an event state of each of a plurality of pixels and a flicker state, according to another example embodiment.

FIG. 10A is a state diagram illustrating an operation by which the vision sensor stores an event state of each of a plurality of pixels and a flicker state, according to another example embodiment.

In detail, FIG. 10A is a state diagram indicating a flicker state and an event state of each of the plurality of pixels PX constituting the pixel array 110 by identifying whether flicker has occurred and whether an event has occurred in each of the plurality of pixels PX in operations S220 to S240 of FIG. 9.

In FIG. 10A, it is assumed that, when there is a previous event with a different polarity of the event within a specific period of time (e.g., one reset period) before the EDC 120 detects a target event, the EDC 120 identifies the target event as flicker. That is, when events with different polarities of the events consecutively occur within the specific period of time (e.g., one reset period), the events may be identified as flicker.

Referring to FIG. 8A, the EDC 120 of the vision sensor 100 may include the state register 126, and the state register 126 may include a first flip-flop in which first data indicating whether flicker has occurred is stored, and a second flip-flop in which second data indicating whether an event has occurred is stored. The first flip-flop may be implemented as a 1-bit flip-flop (e.g., a delayed flip-flop) and the second flip-flop may be implemented as a 2-bit flip-flop.

In an example embodiment, the EDC 120 may identify whether flicker has occurred in a target pixel among the plurality of pixels. For example, when it is identified that flicker has occurred in the target pixel, the EDC 120 may store, in the first flip-flop, the first data indicating the target pixel is mapped to the first state corresponding to occurrence of flicker. In contrast, when it is identified that no flicker has occurred in the target pixel, the EDC 120 may store, in the first flip-flop, the first data indicating the target pixel is mapped to the second state corresponding to no occurrence of flicker. For example, the first flip-flop may store the first state as logic high (e.g., the 1-bit logic state "1") and store the second state as logic low (e.g., the 1-bit logic state "0").

The state register 126 may include the same number of first flip-flops as the plurality of pixels.

In an example embodiment, the EDC 120 may reset the first data by transmitting, to the first flip-flop, a first reset signal for resetting the first data in each preset reset period. In this case, the EDC 120 may perform a delayed reset when the target pixel is in the first state and perform a default reset (e.g., initialize/reset a flicker state of the target pixel to "0") when the target pixel is in the second state. In this regard, the "delayed reset" may mean that the first flip-flop performs reset by delaying the first reset signal to a period following a period in which the first reset signal is received. For example, data (e.g., the first data) for the flicker state of the target pixel stored in the first flip-flop may be reset in a reset period following the period in which the first reset signal is received from the EDC 120, according to the delayed reset (e.g., the 1-clock delayed reset). The EDC 120 may identify flicker (e.g., flicker caused by turning on a surrounding lighting) in which the brightness of light changes at a relatively long period through a delayed reset of the first data of the target pixel.

For example, the EDC 120 may generate a first reset signal of a reset signal of a second period when a preset first period has elapsed and transmit the first reset signal to the first flip-flop, and the first flip-flop may perform a delayed reset of resetting the first data in a third reset period, which is a period following a period in which the first reset signal of the reset signal of the second period is received. However, when another flicker signal has occurred in a second reset period, the first flip-flop may not perform the delayed reset but maintain the first data regardless of the first reset signal 820 of the second period.

In an example embodiment, the EDC 120 may identify whether an event has occurred in the target pixel among the plurality of pixels. For example, when it is detected that the brightness of light increases in the target pixel, the EDC 120 may store, in the second flip-flop, the second data indicating the target pixel is mapped to the third state corresponding to occurrence of an on-event. When it is detected that the brightness of light decreases in the target pixel, the EDC 120 may store, in the second flip-flop, the second data indicating the target pixel is mapped to the fourth state corresponding to occurrence of an off-event. In contrast, when it is identified that no event has occurred in the target pixel, the EDC 120 may store, in the second flip-flop, the second data indicating the target pixel is mapped to the fifth state corresponding to no occurrence of an event. For example, the second flip-flop may store the third state as a 2-bit logic state "01", the fourth state as a 2-bit logic state "10", and the fifth state as a 2-bit logic state "00". The state register 126 may include the same number of second flip-flops as the plurality of pixels.

In an example embodiment, the EDC 120 may reset the second data by transmitting, to the second flip-flop, a second reset signal for resetting the second data in each preset reset period. In this case, the EDC 120 may perform a reset according to conditions (hereinafter, referred to as "conditional reset") when the target pixel is in the third state and the fourth state, and perform a default reset (e.g., initialize/reset an event state of the target pixel to "00") when the target pixel is in the fifth state. For example, for the conditional reset, when the target pixel is mapped to the third state, the EDC 120 may reset the second data through first condition reset, and when the target pixel is mapped to the fourth state, the EDC 120 may reset the second data through second condition reset.

When the first condition and the second condition are satisfied, the second data mapped to the third state and the fourth state and stored in the second flip-flop may be reset in a period in which the second reset signal is received from the EDC 120 (hereinafter, referred to as the conditional reset). In this regard, the "first condition" may mean that a reset signal is received from the EDC 120, and the "second condition" may mean that the first flip-flop is in the second state (e.g., a state in which no flicker has occurred in the target pixel) at a time point when a reset signal is received.

Although it has been described that the state register 126 of the EDC 120 of the vision sensor 100 in FIG. 10A includes the first flip-flop and the second flip-flop to identify/store a flicker occurrence state and an event occurrence state of a target pixel, example embodiments are not limited thereto. The state register 126 of the EDC 120 according to an example embodiment may include various types of modules, including counters and memories (e.g., SRAM and DRAM), to identify/store the flicker occurrence state and the event occurrence state of the target pixel.

Figure 10B:
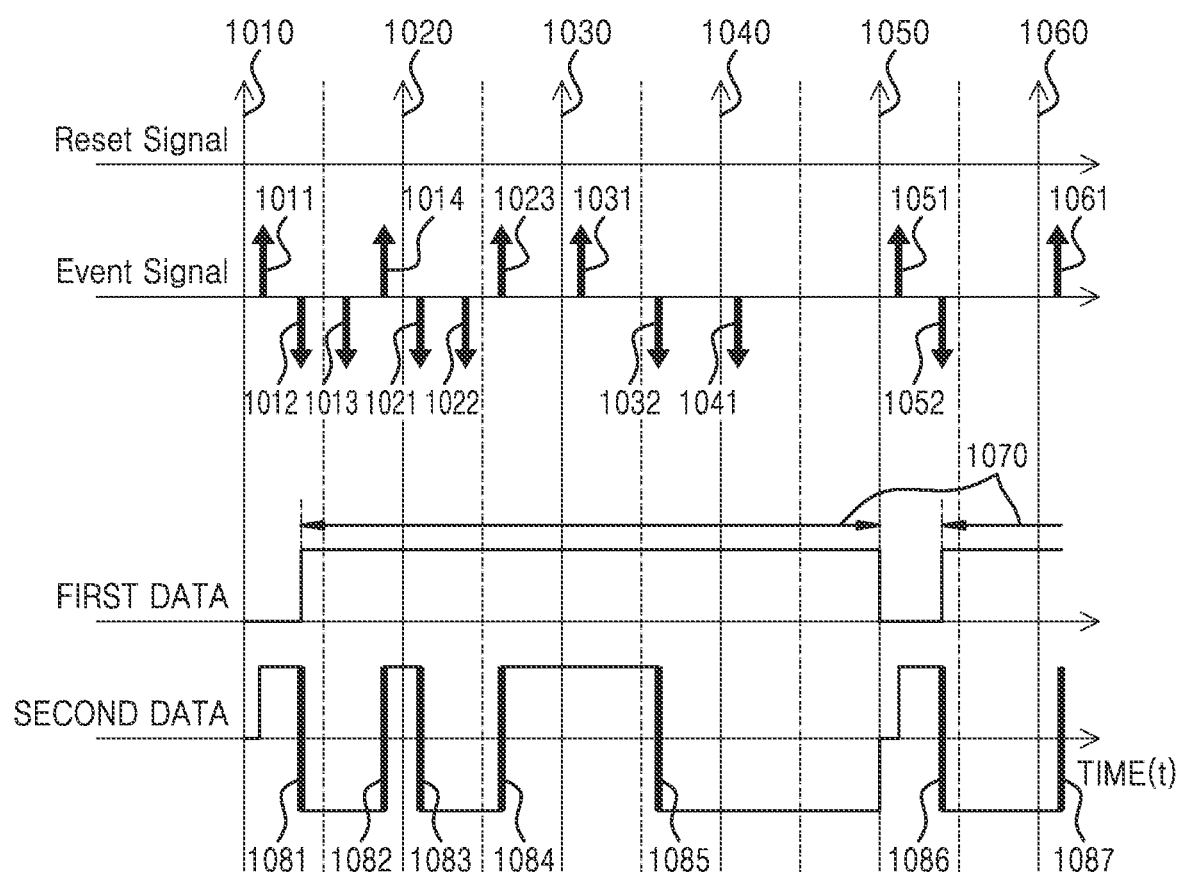
FIG. 10B is a timing diagram of an operation by which a vision sensor stores the event state and the flicker state in FIG. 10A, according to another example embodiment.

FIG. 10B is a timing diagram of an operation by which the vision sensor stores the event state and the flicker state in FIG. 10A, according to another example embodiment.

In detail, FIG. 10B is a timing diagram for the first data stored in the first flip-flop of the state register 126 and the second data stored in the second flip-flop of the state register 126 in FIG. 10A.

In FIG. 10B, it is assumed that, when there is a previous event with a different polarity of the event within a specific period of time (e.g., one reset period) before the EDC 120 detects a target event, the EDC 120 identifies the target event as flicker. That is, when events that change in different polarities of the events occur within the specific period of time (e.g., one reset period), the EDC 120 may identify the events as flicker.

Also, the EDC 120 may generate a reset signal when a preset reset period has elapsed and transmit the reset signal to the first flip-flop and the second flip-flop. In this case, the reset signal may include a first reset signal for resetting the first data of the first flip-flop and a second reset signal for resetting the second data of the second flip-flop. The reset period refers to a period from a time point when a reset signal is received to a time point when a next reset signal is received. For example, a first reset period may refer to a period from a time point when a reset signal 1010 of a first period is received to a time point when a reset signal 1020 of a second period is received, and a second reset period may refer to a period from a time point when the reset signal 1020 of the second period is received to a time point when a reset signal 1030 of a third period is received.

Referring to FIG. 10B, the horizontal axis of the timing diagram may indicate time (t), and the vertical axis may include first data indicating a state of a reset signal, a state of an event signal, and a flicker occurrence state of a target pixel over time, and second data indicating an event occurrence state. Also, in the timing diagram, a portion of the second data marked with a thick solid line that changes from an on-event to an off-event or from an off-event to an on-event indicates occurrence of flicker.

Referring to FIGS. 10A and 10B, the EDC 120 may detect generation of a first event signal 1011 to a fourth event signal 1014 during the first reset period (e.g., the first reset period refers to the period from the time point when the reset signal 1010 of the first period is received to the time point when the reset signal 1020 of the second period is received). At a time point when the first event signal 1011 is generated, the EDC 120 may change the state of the second data from the fifth state (e.g., the 2-bit logic state "00") to the third state (e.g., the 2-bit logic state "01") and store the second data in the second flip-flop. At a time point when a second event signal 1012 is generated, the EDC 120 may change the state of the first data from the second state (e.g., the 1-bit logic state "0") to the first state (e.g., the 1-bit logic state "1") and store the first data in the first flip-flop, and may change the state of the second data from the third state (e.g., the 2-bit logic state "01") to the fourth state (e.g., the 2-bit logic state "10") (in this case, the EDC 120 identifies this as occurrence of flicker) and store the second data in the second flip-flop. At a time point when a third event signal 1013 is generated, the EDC 120 may maintain the state of the first data in the first state (e.g., the 1-bit logic state "1") and store the first data in the first flip-flop, and may maintain the state of the second data in the fourth state (e.g., the 2-bit logic state "10") and store the second data in the second flip-flop. At a time point when the fourth event signal 1014 is generated, the EDC 120 may maintain the state of the first data in the first state (e.g., the 1-bit logic state "1") and store the first data in the first flip-flop, and may change the state of the second data from the fourth state (e.g., the 2-bit logic state "10") to the third state (e.g., the 2-bit logic state "01") (in this case, the EDC 120 identifies this as occurrence of flicker) and store the second data in the second flip-flop.

The EDC 120 may generate a reset signal 1020 (e.g., the first reset signal) of a second period when a preset first reset period has elapsed, and transmit the reset signal 1020 to the first flip-flop. The first flip-flop may perform a delayed reset on the first data at the third reset period (e.g., the time point when the reset signal 1030 of the third period is received), which is a period following a period in which the reset signal 1020 (e.g., the first reset signal) of the second period is received.

However, because another flicker signal has occurred in the first reset period, the first flip-flop may not perform the delayed reset but maintain the first data regardless of the reset signal 1010 (e.g., the first reset signal) of the first period.

The EDC 120 may generate the reset signal 1020 (e.g., the second reset signal) of the second period when the preset first reset period has elapsed, and transmit the reset signal 1020 to the second flip-flop. Because the first flip-flop is not in the second state (e.g., the 1-bit logic state "0") at the time point when the reset signal 1020 (e.g., the second reset signal) of the second period is received (that is, the conditions of the conditional reset are not satisfied), the second flip-flop does not perform a reset and maintains the second data.

The EDC 120 may detect generation of a fifth event signal 1021 to a seventh event signal 1023 during the second reset period (e.g., the second reset period refers to a period from the time point when the reset signal 1020 of the second period is received to the time point when the reset signal 1030 of a third period is received). At a time point when the fifth event signal 1021 is generated, the EDC 120 may maintain the state of the first data in the first state (e.g., the 1-bit logic state "1") and store the first data in the first flip-flop, and may change the state of the second data from the third state (e.g., the 2-bit logic state "01") to the fourth state (e.g., the 2-bit logic state "10") (in this case, the EDC 120 identifies this as occurrence of flicker) and store the second data in the second flip-flop. At a time point when a sixth event signal 1022 is generated, the EDC 120 may maintain the state of the first data in the first state (e.g., the 1-bit logic state "1") and store the first data in the first flip-flop, and may maintain the state of the second data in the fourth state (e.g., the 2-bit logic state "10") and store the second data in the second flip-flop. At a time point when the seventh event signal 1023 is generated, the EDC 120 may maintain the state of the first data in the first state (e.g., the 1-bit logic state "1") and store the first data in the first flip-flop, and may change the state of the second data from the fourth state (e.g., the 2-bit logic state "10") to the third state (e.g., the 2-bit logic state "01") (in this case, the EDC 120 identifies this as occurrence of flicker) and store the second data in the second flip-flop.

The EDC 120 may generate the reset signal 1030 (e.g., the first reset signal) of the third period when a preset second reset period has elapsed, and transmit the reset signal 1030 to the first flip-flop. The first flip-flop may perform a delayed reset on the first data at a fourth reset period (e.g., a time point when a reset signal 1040 of a fourth period is received), which is a period following a period in which the reset signal 1030 (e.g., the first reset signal) of the third period is received.

However, because another flicker signal has occurred in the second reset period, the first flip-flop may not perform the delayed reset but maintain the first data regardless of the reset signal 1020 (e.g., the first reset signal) of the second period.

The EDC 120 may generate the reset signal 1030 (e.g., the second reset signal) of the third period when the preset second reset period has elapsed, and transmit the reset signal 1030 to the second flip-flop. Because the first flip-flop is not in the second state (e.g., the 1-bit logic state "0") at the time point when the reset signal 1030 (e.g., the second reset signal) of the third period is received (that is, the conditions of the conditional reset are not satisfied), the second flip-flop does not perform a reset and maintains the second data.

The EDC 120 may detect generation of an eighth event signal 1031 and a ninth event signal 1032 during the third reset period (e.g., the third reset period refers to a period from the time point when the reset signal 1030 of the third period is received to the time point when the reset signal 1040 of the fourth period is received). At a time point when the eighth event signal 1031 is generated, the EDC 120 may maintain the state of the first data in the first state (e.g., the 1-bit logic state "1") and store the first data in the first flip-flop, and may maintain the state of the second data in the third state (e.g., the 2-bit logic state "01") and store the second data in the second flip-flop. At a time point when the ninth event signal 1032 is generated, the EDC 120 may maintain the state of the first data in the first state (e.g., the 1-bit logic state "1") and store the first data in the first flip-flop, and may change the state of the second data from the third state (e.g., the 2-bit logic state "01") to the fourth state (e.g., the 2-bit logic state "10") (in this case, the EDC 120 identifies this as occurrence of flicker) and store the second data in the second flip-flop.

The EDC 120 may generate the reset signal 1040 (e.g., the first reset signal) of the fourth period when a preset third reset period has elapsed, and transmit the reset signal 1040 to the first flip-flop. The first flip-flop may perform a delayed reset on the first data at a fifth reset period (e.g., a time point when a reset signal 1050 of a fifth period is received), which is a period following a period in which the reset signal 1040 (e.g., the first reset signal) of the fourth period is received.

However, because another flicker signal has occurred in the third reset period, the first flip-flop may not perform the delayed reset but maintain the first data regardless of the reset signal 1030 (e.g., the first reset signal) of the third period.

The EDC 120 may generate the reset signal 1040 (e.g., the second reset signal) of the fourth period when the preset third reset period has elapsed, and transmit the reset signal 1040 to the second flip-flop. Because the first flip-flop is not in the second state (e.g., the 1-bit logic state "0") at the time point when the reset signal 1040 (e.g., the second reset signal) of the fourth period is received (that is, the conditions of the conditional reset are not satisfied), the second flip-flop does not perform a reset and maintains the second data.

The EDC 120 may detect generation of a tenth event signal 1041 during the fourth reset period (e.g., the fourth reset period refers to a period from the time point when the reset signal 1040 of the fourth period is received to the time point when the reset signal 1050 of the fifth period is received). At a time point when the tenth event signal 1041 is generated, the EDC 120 may maintain the state of the first data in the first state (e.g., the 1-bit logic state "1") and store the first data in the first flip-flop, and may maintain the state of the second data in the fourth state (e.g., the 2-bit logic state "10") and store the second data in the second flip-flop.

The EDC 120 may generate the reset signal 1050 (e.g., the first reset signal) of the fifth period when a preset fourth reset period has elapsed, and transmit the reset signal 1050 to the first flip-flop. The first flip-flop may perform a delayed reset on the first data at a sixth reset period (e.g., a time point when a reset signal 1060 of a sixth period is received), which is a period following a period in which the reset signal 1050 (e.g., the first reset signal) of the fifth period is received.

Because another flicker signal has not occurred in the fourth reset period, the first flip-flop may change to the second state (e.g., the 1-bit logic state "0") by performing a delayed reset on the first data at the time point when the reset signal 1050 (e.g., the first reset signal) of the fifth period is received, according to the reset signal 1040 (e.g., the first reset signal) of the fourth period.

The EDC 120 may generate the reset signal 1050 (e.g., the second reset signal) of the fifth period when the preset fourth reset period has elapsed, and transmit the reset signal 1050 to the second flip-flop. Because the first flip-flop is not in the second state (e.g., the 1-bit logic state "0") at the time point when the reset signal 1050 (e.g., the second reset signal) of the fifth period is received (that is, the conditions of the conditional reset are satisfied), the second flip-flop may reset the second data and change to the fifth state (e.g., the 2-bit logic state "00").

The EDC 120 may detect generation of an eleventh event signal 1041 and a twelfth event signal 1042 during the fifth reset period (e.g., the fifth reset period refers to a period from the time point when the reset signal 1050 of the fifth period is received to the time point when the reset signal 1060 of the sixth period is received). At a time point when the eleventh event signal 1041 is generated, the EDC 120 may maintain the state of the first data in the second state (e.g., the 1-bit logic state "0") and store the first data in the first flip-flop, and may change the state of the second data from the fifth state (e.g., the 2-bit logic state "00") to the third state (e.g., the 2-bit logic state "01") and store the second data in the second flip-flop. At a time point when the twelfth event signal 1042 is generated, the EDC 120 may maintain the state of the first data in the first state (e.g., the 1-bit logic state "1") and store the first data in the first flip-flop, and may change the state of the second data from the third state (e.g., the 2-bit logic state "01") to the fourth state (e.g., the 2-bit logic state "10") (in this case, the EDC 120 identifies this as occurrence of flicker) and store the second data in the second flip-flop.

The EDC 120 may generate the reset signal 1060 (e.g., the first reset signal) of the sixth period when a preset fifth reset period has elapsed, and transmit the reset signal 1060 to the first flip-flop. The first flip-flop may perform a delayed reset on the first data at a seventh reset period (e.g., a time point when a reset signal of a seventh period is received), which is a period following a period in which the reset signal 1060 (e.g., the first reset signal) of the sixth period is received.

However, because another flicker signal has occurred in the fifth reset period, the first flip-flop may not perform the delayed reset but maintain the first data regardless of the reset signal 1050 (e.g., the first reset signal) of the fifth period.

The EDC 120 may generate the reset signal 1060 (e.g., the second reset signal) of the sixth period when the preset fifth reset period has elapsed, and transmit the reset signal 1060 to the second flip-flop. Because the first flip-flop is not in the second state (e.g., the 1-bit logic state "0") at the time point when the reset signal 1060 (e.g., the second reset signal) of the sixth period is received (that is, the conditions of the conditional reset are not satisfied), the second flip-flop does not perform a reset and maintains the second data.

The EDC 120 may detect generation of a thirteenth event signal 1061 during the seventh reset period (e.g., the seventh reset period refers to a period from the time point when the reset signal of the seventh period is received to a time point when a reset signal of an eighth period is received). At a time point when the thirteenth event signal 1061 is generated, the EDC 120 may maintain the state of the first data in the second state (e.g., the 1-bit logic state "0") and store the first data in the first flip-flop, and may change the state of the second data from the fourth state (e.g., the 2-bit logic state "10") to the third state (e.g., the 2-bit logic state "01") (in this case, the EDC 120 identifies this as occurrence of flicker) and store the second data in the second flip-flop.

The EDC 120 may generate the reset signal (e.g., the first reset signal) of the seventh period when a preset sixth reset period has elapsed and transmit the reset signal to the first flip-flop. The first flip-flop may perform a delayed reset on the first data at an eighth reset period (e.g., the time point when the reset signal of the eighth period is received), which is a period following a period in which the reset signal (e.g., the first reset signal) of the seventh period is received.

However, because another flicker signal has occurred in the sixth reset period, the first flip-flop may not perform the delayed reset but maintain the first data regardless of the reset signal 1060 (e.g., the first reset signal) of the sixth period.

The EDC 120 may generate the reset signal (e.g., the second reset signal) of the seventh period when the preset sixth reset period has elapsed, and transmit the reset signal to the second flip-flop. Because the first flip-flop is not in the second state (e.g., the 1-bit logic state "0") at the time point when the reset signal (e.g., the second reset signal) of the seventh period is received (that is, the conditions of the conditional reset are not satisfied), the second flip-flop does not perform a reset and maintains the second data.

The EDC 120 may identify a portion 1070 of the first data corresponding to the first state (e.g., the 1-bit logic state "1"), as a state in which flicker has occurred in the target pixel. The EDC 120 may generate event data EDT for valid events, by comparing the first data with the second data and removing a portion of the second data corresponding to the portion 1070 (e.g., a flicker occurrence portion) of the first data corresponding to the first state.

As described above, according to an example embodiment, the vision sensor identifies whether flicker has occurred, whether an event has occurred, and a polarity of the event, and removes the flicker based on the first and second flip-flops, and generates event data for valid events using a minimum capacity without using a separate memory, such that the performance of the imaging processing system may be improved.

Although the EDC 120 of the vision sensor 100 in FIG. 10B has been described that the state register 126 includes the first flip-flop and the second flip-flop to identify and store the flicker occurrence state and the event occurrence state of the target pixel, example embodiments are not limited thereto. The state register 126 of the EDC 120 according to an example embodiment may include various types of modules, including counters and memories (e.g., SRAM and DRAM), to identify and store the flicker occurrence state and the event occurrence state of the target pixel.

Figure 11:
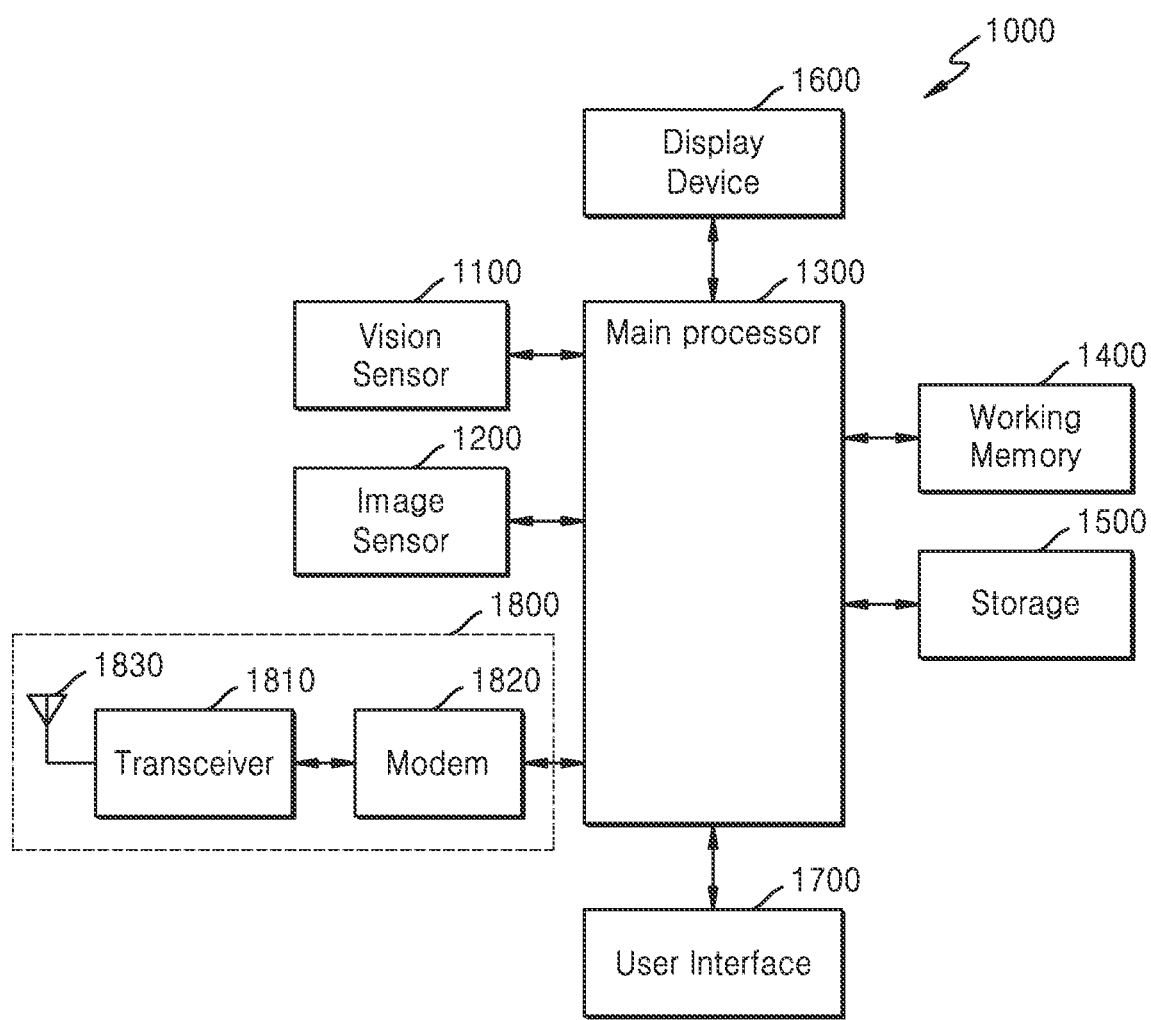
FIG. 11 is a block diagram of an electronic device to which a vision sensor is applied, according to an example embodiment.

FIG. 11 is a block diagram of an electronic device 1000 to which a vision sensor 1100 is applied, according to an example embodiment.

Referring to FIG. 11, the electronic device 1000 may include a vision sensor 1100, an image sensor 1200, a main processor 1300, a working memory 1400, a storage 1500, a display device 1600, a user interface 1700, and a communicator 1800. In addition, example embodiments are not limited thereto, and the electronic device 1000 may be implemented such that at least some of the aforementioned components are omitted or additional components are added.

The vision sensors 100 and 100a described above with reference to FIGS. 1 to 10B may be applied as the vision sensor 1100. The vision sensor 1100 may sense an object to generate event signals, and transmit the generated event signals to the main processor 1300.

The image sensor 1200 may generate image data, for example, raw image data, based on a received optical signal, and provide the image data to the main processor 1300.

The main processor 1300 may control the overall operation of the electronic device 1000 and may detect movement of an object by processing the event data, that is, the event signals received from the vision sensor 1100. The vision sensor 1100 may detect a valid event by removing flicker using a state register including a first flip-flop storing a flicker occurrence state of each of a plurality of pixels and a second flip-flop storing an event occurrence state. The state register may be configured by being changed to a counter or memory (e.g., SRAM, DRAM, etc.), in addition to the first flip-flop and the second flip-flop.

The working memory 1400 may store data used for the operation of the electronic device 1000. For example, the working memory 1400 may temporarily store packets or frames processed by the main processor 1300. For example, the working memory 1400 may include volatile memory such as DRAM or synchronous RAM (SDRAM), and/or nonvolatile memory such as phase-change RAM (PRAM), magneto-resistive RAM (MRAM), resistive RAM (Re-RAM), or ferroelectric RAM (FRAM).

The storage 1500 may store data requested to be stored from the main processor 1300 or other components. The storage 1500 may include nonvolatile memory such as flash memory, PRAM, MRAM, ReRAM, or FRAM.

The display device 1600 may include a display panel, a display driving circuit, and a display serial interface (DSI). For example, the display panel may be implemented as various devices such as a liquid crystal display (LCD) device, a light-emitting diode (LED) display device, an organic LED (OLED) display device, and an active matrix OLED (AMOLED) display device. The display driving circuit may include a timing controller, a source driver, etc. necessary for driving the display panel. A DSI host built into the main processor 1300 may perform serial communication with the display panel through the DSI.

The user interface 1700 may include at least one of input interfaces such as a keyboard, a mouse, a keypad, a button, a touch panel, a touch screen, a touch pad, a touch ball, a gyroscope sensor, a vibration sensor, and an acceleration sensor.

The communicator 1800 may exchange signals with an external device/system through an antenna 1830. A transceiver 1810 and a modulator/demodulator (MODEM) 1820 of the communicator 1800 may process the signals exchanged with the external device/system according to wireless communication protocols, such as long term evolution (LTE), worldwide interoperability for microwave access (WIMAX), global system for mobile communication (GSM), code division multiple access (CDMA), Bluetooth, near field communication (NFC), wireless fidelity (Wi-Fi), and radio frequency identification (RFID).

The components of the electronic device 1000, for example, the vision sensor 1100, the image sensor 1200, the main processor 1300, the working memory 1400, the storage 1500, the display device 1600, the user interface 1700, and the communicator 1800, may exchange data based on one or more of various interface protocols, such as universal serial bus (USB), small computer system interface (SCSI), MIPI, inter-integrated circuit (I2C), peripheral component interconnect express (PCIe), mobile PCIe (M-PCIe), advanced technology attachment (ATA), parallel ATA (PATA), serial ATA (SATA), serial attached SCSI (SAS), integrated drive electronics (IDE), enhanced IDE (EIDE), nonvolatile memory express (NVMe), and universal flash storage (UFS).

While aspects of example embodiments have been particularly shown and described, it will be understood that various changes in form and details may be made therein without departing from the spirit and scope of the following claims.

What is claimed is:

1. A vision sensor comprising:
    a pixel array comprising a plurality of pixels, each of the plurality of pixels being configured to generate an event signal based on an event in which intensity of incident light changes; and
    an event detection circuit comprising a state register comprising a first flip-flop and a second flip-flop,
    wherein the event detection circuit is configured to:
        based on the event signal, store first data in the first flip-flop, the first data indicating whether flicker has occurred in each of the plurality of pixels,
        store second data in the second flip-flop, the second data indicating whether the event has occurred in each of the plurality of pixels, and
        based on a comparison of the first data and the second data, identify and delete a portion of the second data in which the flicker has occurred.

2. The vision sensor of claim 1, wherein the first flip-flop is configured to store, as the first data, information indicating, a first state corresponding to occurrence of the flicker in a corresponding pixel of the plurality of pixels or information indicating a second state corresponding to no occurrence of the flicker in the corresponding pixel.

3. The vision sensor of claim 2, wherein the event detection circuit is further configured to transmit, to the first flip-flop, a first reset signal for resetting the first data in each of a plurality of preset reset periods, and
    wherein the first flip-flop is configured to, based on the first reset signal, reset the first data in a subsequent period following a period in which the first reset signal is received.

4. The vision sensor of claim 3, wherein the second flip-flop is configured to store, as the second data, information indicating a third state corresponding to occurrence of the event in the corresponding pixel and information indicating a fourth state corresponding to no occurrence of the event in the corresponding pixel.

5. The vision sensor of claim 4, wherein the event detection circuit is further configured to transmit, to the second flip-flop, a second reset signal for resetting the second data in each of the plurality of preset reset periods, and
    wherein the second flip-flop is configured to, based on the first flip-flop being reset and the second reset signal being received, reset the second data in a period in which the second reset signal is received.

6. The vision sensor of claim 1, wherein the event detection circuit is further configured to identify a target event as the flicker based on the target event and another event occurring within a specific period of time.

7. The vision sensor of claim 1, wherein the first flip-flop comprises a 1-bit delayed flip-flop,
    wherein the second flip-flop comprises a 1-bit flip-flop, and
    wherein the event detection circuit is further configured to process the event signal by reading the event signal from the pixel array based on a synchronous method or an asynchronous method.

8. An operating method of a vision sensor, the operating method comprising:
    reading an event signal from a pixel array including a plurality of pixels configured to generate the event signal by detecting an event in which intensity of incident light changes;
    based on the event signal, storing first data in a first flip-flop, the first data indicating whether flicker has occurred in each of the plurality of pixels;
    storing second data in a second flip-flop, the second data indicating whether the event has occurred in each of the plurality of pixels; and
    based on a comparison of the first data and the second data, identifying and deleting a portion of the second data in which the flicker has occurred.

9. The operating method of claim 8, further comprising storing, in the first flip-flop, as the first data, information indicating a first state corresponding to occurrence of the flicker in a corresponding pixel of the plurality of pixels or information indicating a second state corresponding to no occurrence of the flicker in the corresponding pixel.

10. The operating method of claim 9, further comprising resetting the first data in each of a plurality of preset reset periods,
    wherein the resetting of the first data comprises:
        generating a first reset signal in the each of the plurality of preset reset periods, and
        resetting the first data in a reset period subsequent a time point in which the first reset signal is generated.

11. The operating method of claim 10, further comprising storing, as the second data, information indicating a third state corresponding to occurrence of the event in the corresponding pixel and information indicating a fourth state corresponding to no occurrence of the event in the corresponding pixel.

12. The operating method of claim 11, further comprising resetting the second data in the each of the plurality of preset reset periods,
- wherein the resetting of the second data comprises:
  - generating a second reset signal in the each of the plurality of preset reset periods, and
  - based on the first flip-flop being reset and the second reset signal being generated, resetting the second data in a reset period in which the second reset signal is generated.

13. The operating method of claim 11, further comprising, based on a target event and another event occurring within a specific period of time, identifying the target event as the flicker.

14. The operating method of claim 8, wherein the first flip-flop includes a 1-bit delayed flip-flop,
- wherein the second flip-flop includes a 1-bit flip-flop, and
- wherein the vision sensor further includes a state register.

15. A vision sensor comprising:
- a pixel array comprising a plurality of pixels, each of the plurality of pixels being configured to generate an event signal based on an event in which intensity of incident light changes; and
- an event detection circuit configured to read the event signal from the pixel array and process the event signal, the event detection circuit comprising a state register comprising a first flip-flop and a second flip-flop,
- wherein the event detection circuit is configured to:
  - store, in the first flip-flop, first data to which a first state and a second state are mapped, the first state indicating flicker occurs in a corresponding pixel of the plurality of pixels, and the second state indicating no occurrence of the flicker in the corresponding pixel,
  - store, in the second flip-flop, second data to which a third state, a fourth state, and a fifth state are mapped, the third state indicating an on-event in the corresponding pixel, the fourth state indicating an off-event in the corresponding pixel, and the fifth state indicating no occurrence of the event in the corresponding pixel, and
  - based on a comparison of the first data and the second data, identify and delete a portion of the second data corresponding to the first state of the first data.

16. The vision sensor of claim 15, wherein the event detection circuit is further configured to, based on a previous event that is detected before a target event having a polarity that is different from a polarity of the target event, identify that the flicker has occurred.

17. The vision sensor of claim 15, wherein the event detection circuit is further configured to transmit, to the first flip-flop, a first reset signal for resetting the first data in each of a plurality of preset reset periods, and
- wherein the first flip-flop is configured to, based on the first reset signal, reset the first data in a subsequent period following a period in which the first reset signal is received.

18. The vision sensor of claim 17, wherein the event detection circuit is further configured to transmit, to the second flip-flop, a second reset signal for resetting the second data in each of the plurality of preset reset periods, and
- wherein the second flip-flop is configured to, based on the first flip-flop being reset and the second reset signal being received, reset the second data in a period in which the second reset signal is received.

19. The vision sensor of claim 15, wherein the first flip-flop comprises a 1-bit delayed flip-flop, and
- wherein the second flip-flop comprises a 2-bit flip-flop.

20. The vision sensor of claim 15, wherein the event detection circuit is further configured to process the event signal by reading the event signal from the pixel array based on a synchronous method or an asynchronous method.

* * * * *